(12) United States Patent
Kamizuma et al.

(10) Patent No.: US 10,008,953 B2
(45) Date of Patent: Jun. 26, 2018

(54) POWER CONVERSION DEVICE AND POWER CONVERSION METHOD FOR POWER CONVERSION DEVICE

(71) Applicant: Hitachi, Ltd., Chiyoda-ku, Tokyo (JP)

(72) Inventors: Hiroshi Kamizuma, Tokyo (JP); Yukio Hattori, Tokyo (JP); Tetsuya Kawashima, Tokyo (JP); Akira Mima, Tokyo (JP); Daisuke Matsumoto, Tokyo (JP); Yuuichi Mabuchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days. days.

(21) Appl. No.: 15/304,171

(22) PCT Filed: May 7, 2014

(86) PCT No.: PCT/JP2014/062285
§ 371 (c)(1),
(2) Date: Oct. 14, 2016

(87) PCT Pub. No.: WO2015/170377
PCT Pub. Date: Nov. 12, 2015

(65) Prior Publication Data
US 2017/0033593 A1 Feb. 2, 2017

(51) Int. Cl.
*H02M 1/00* (2006.01)
*H02M 7/00* (2006.01)
(Continued)

(52) U.S. Cl.
CPC ............. *H02M 7/003* (2013.01); *H02M 5/45* (2013.01); *H02M 7/217* (2013.01); *H02J 9/06* (2013.01)

(58) Field of Classification Search
CPC .......... H02M 5/40; H02M 5/42; H02M 5/453; H02M 7/7575; H02M 5/458; H02M 5/45;
(Continued)

(56) References Cited

U.S. PATENT DOCUMENTS

2007/0153555 A1 7/2007 Stulz et al.
2009/0219696 A1* 9/2009 Nakayama ............ H02M 7/003
361/709

(Continued)

FOREIGN PATENT DOCUMENTS

EP 0 693 820 A1 1/1996
JP 8-33336 A 2/1996
(Continued)

OTHER PUBLICATIONS

International Search Report (PCT/ISA/210) issued in PCT Application No. PCT/JP2014/062285 dated Jul. 29, 2014 with English translation (5 pages).

*Primary Examiner* — Nguyen Tran
(74) *Attorney, Agent, or Firm* — Crowell & Moring LLP

(57) ABSTRACT

An uninterruptible power-supply system is a power converter having a PN laminated bus bar and a plurality of power conversion units and supplying power from a commercial power supply via a converter and an inverter. The power conversion units each have positive side terminals connected to each other and negative side terminals connected to each other through the PN laminated bus bar. At least one power conversion unit constitutes a phase of the converter. At least another one power conversion unit constitutes a phase of the inverter and has the positive side terminal lying adjacent to and connected through the PN laminated bus bar to the positive side terminal of the corresponding power conversion unit constituting the phase of the converter and the negative side terminal lying adja-
(Continued)

cent to and connected to the negative side terminal of the corresponding power conversion unit constituting the phase of the converter.

13 Claims, 21 Drawing Sheets

(51) Int. Cl.
*H02M 5/45* (2006.01)
*H02M 7/217* (2006.01)
*H02J 9/06* (2006.01)

(58) Field of Classification Search
CPC .. H02M 5/4585; H02M 5/4505; H02M 5/451; H02M 5/452; H02M 7/003; H02H 7/261; H02H 7/268; H02J 3/36; H01L 25/112; H01L 25/115; H01R 13/6675; H01R 31/065; G09G 3/20

See application file for complete search history.

(56) References Cited

U.S. PATENT DOCUMENTS

| | | | |
|---|---|---|---|
| 2009/0284079 | A1 | 11/2009 | Jahkonen |
| 2011/0299307 | A1 | 12/2011 | Sato et al. |
| 2013/0314953 | A1* | 11/2013 | Cuzner ............... H02M 5/4585 363/37 |
| 2014/0321090 | A1* | 10/2014 | Guerin .................. H02M 7/003 361/782 |

FOREIGN PATENT DOCUMENTS

| | | | |
|---|---|---|---|
| JP | 2001-268912 A | 9/2001 |
| JP | 2002-51569 A | 2/2002 |
| JP | 2002-300800 A | 10/2002 |
| JP | 2008-503994 A | 2/2008 |
| JP | 2012-151939 A | 8/2012 |
| JP | 2013-59151 A | 3/2013 |
| WO | WO 2008/099049 A1 | 8/2008 |
| WO | WO 2009/040933 A1 | 4/2009 |
| WO | WO 2010/106652 A1 | 9/2010 |

* cited by examiner

POWER CONVERSION DEVICE AND POWER CONVERSION METHOD FOR POWER CONVERSION DEVICE

TECHNICAL FIELD

The present invention relates to a power conversion device including a converter and an inverter, and relates to a power conversion method for the power conversion device.

BACKGROUND ART

For a power conversion device in recent years, innovation in technology of a power semiconductor module, which is a main component of the power conversion device, has realized faster switching operation to reduce loss generated by this power semiconductor. Thus, particularly, a cooling unit can be downsized, and as a result, a power conversion device can be downsized. Particularly, an uninterruptible power-supply system called UPS is often installed in the surrounding of a large city, where the land prices are high, for a data center, and it is accordingly desired that the installation area is small.

An uninterruptible power-supply system is configured including, in addition to semiconductor modules, busbars, by a fuse for protection against short-circuit fault, capacitors for smoothing a direct current power, and the like. Downsizing of an uninterruptible power-supply system also essentially requires downsizing of capacitors in addition to downsizing of a power semiconductor module.

For downsizing of capacitors, reduction in the number of capacitors in parallel by reduction in the capacitance is essential. In order to reduce the required capacitance of a capacitor, reduction in the ripple current of a converter is essential.

Technology related to reducing ripple current of a power converter is described, for example, in Patent Document 1. In PROBLEM TO BE SOLVED of Abstract of Patent Document 1, described is "To provide a power converter for suppressing ripple current flowing in a current smoothing capacitor." In SOLUTION of Abstract, described is "Three-phase bridge circuits 1A, 1B are connected to a power source comprising a battery Vb and the current smoothing capacitor C in parallel. Each bridge circuit operates in accordance with a PWM signal from drive circuits 11A, 11B, and power-converts to drive a first motor 25A and a second motor 25B. Triangular wave generators 7, 8 generate triangular waves TR1, TR2 having a phase difference of 90 degrees. When both the motors are during power running or regenerative operation, the PWM signal driving the first motor is generated on the basis of the triangular wave TR1, and the PWM signal driving the second motor is generated on the basis of the triangular wave TR2. The phase of the ripple current generated in each bridge circuit by the phase difference between both the triangular wave signals is shifted to 180 degrees to be canceled so as to suppress the ripple current flowing in the current smoothing capacitor C small."

BACKGROUND ART DOCUMENT

Patent Document

Patent Document 1: Japanese Patent Application Laid-Open No. 2002-300800

DISCLOSURE OF THE INVENTION

Problem to be Solved by the Invention

The technology described in Patent Document 1 is on assumption that two inverter units drive respective different loads. This technology is different from a general usage of an uninterruptible power-supply system, requires two inverter units, and accordingly hardly contributes to downsizing.

In order to ensure a ripple current reduction effect, it is necessary to increase the interphase sneak current by making the wire distance between two inverter units short to thereby reduce the interphase impedance. However, an uninterruptible power-supply system requires fuse elements between respective phases to protect against short-circuit fault. As these fuses increase interphase impedance, the ripple current reduction effect sometimes cannot be ensured even if the technology described in Patent Document 1 is applied to an interphase impedance.

In most uninterruptible power-supply systems, an inverter and a converter are arranged by respective individual units. Consequently, as the wiring distance between corresponding phases, for example, the U-phase of the inverter and the R-phase of the converter, increases, the interphase impedance increases and the ripple current increases.

In this situation, an object of the present invention is to reduce the ripple current of a capacitor in a power conversion device including a converter and an inverter.

Means for Solving the Problems

To sole the problem, a first invention provides a power converter that includes a laminated conductor, conductors being laminated for the laminated conductor, and plural power conversion units and supplies power from a commercial power source through a converter and an inverter to a load, wherein the power conversion units include respective power semiconductor modules, capacitors, and main circuit busbars, and are provided with respective positive terminals, negative terminals, and AC•DC terminals, the positive terminals being connected with each other and the negative terminals being connected with each other through the laminated conductor, wherein at least one of the power conversion units forms a phase of a converter that converts alternating current input to the AC•DC terminal and supplies the converted current, as direct current, between the positive terminal and the negative terminal thereof, wherein at least another one of the power conversion units forms a phase of the inverter that converts direct current supplied through the positive terminal and the negative terminal thereof and supplies alternating current to the AC•DC terminal, and wherein the power conversion unit forming a certain phase of the inverter is arranged such that the positive terminal thereof is connected through the laminated conductor adjacently to the positive terminal of the power conversion unit that forms the corresponding phase of the converter, and the negative terminal thereof is connected through the laminated conductor adjacently to the negative terminal of the power conversion unit that forms the corresponding phase of the converter.

To solve the problem, a second invention provides a power conversion method for a power converter that includes a laminated conductor, conductors being laminated for the laminated conductor, plural power conversion units, a control circuit that outputs a three-phase PWM control signal, and supplies power from a commercial power source through a converter and an inverter to a load, wherein the power conversion units include respective power semiconductor modules, capacitors, and main circuit busbars, and are provided with respective positive terminals, negative terminals, and AC•DC terminals, the positive terminals being connected with each other and the negative terminals being connected with each other through the laminated conductor, wherein at least three of the power conversion units form a three-phase converter that converts alternating current having been input to the AC•DC terminal and supplies the converted current, as direct current, between the positive terminal and the negative terminal thereof, wherein at least other three of the power conversion units structure a three-phase inverter that converts direct current supplied through the positive terminal and the negative terminal thereof and supplies alternating current to the AC•DC terminal, wherein the respective phases of the three-phase inverter and the respective corresponding phases of the three-phase converter are disposed respectively adjacent to each other, wherein the control circuit:

generates an inverter triangular wave signal and supplies the inverter triangular wave signal to an inverter three-phase PWM signal generation section; and generates a converter triangular wave signal that synchronizes with the inverter triangular wave signal at the same frequency and with a certain phase difference, and supplies the converter triangular wave signal to a converter three-phase PWM signal generation section.

Advantage of the Invention

According to the present invention, in a power conversion device including an inverter and a converter, the ripple current of a capacitor can be reduced.

EMBODIMENTS FOR CARRYING OUT THE INVENTION

In the following, embodiments for carrying out the present invention will be described, with reference to the drawings. Incidentally, in the embodiments, uninterruptible power-supply systems will be described as representative examples of a power conversion device.

First Embodiment

Figure 1:
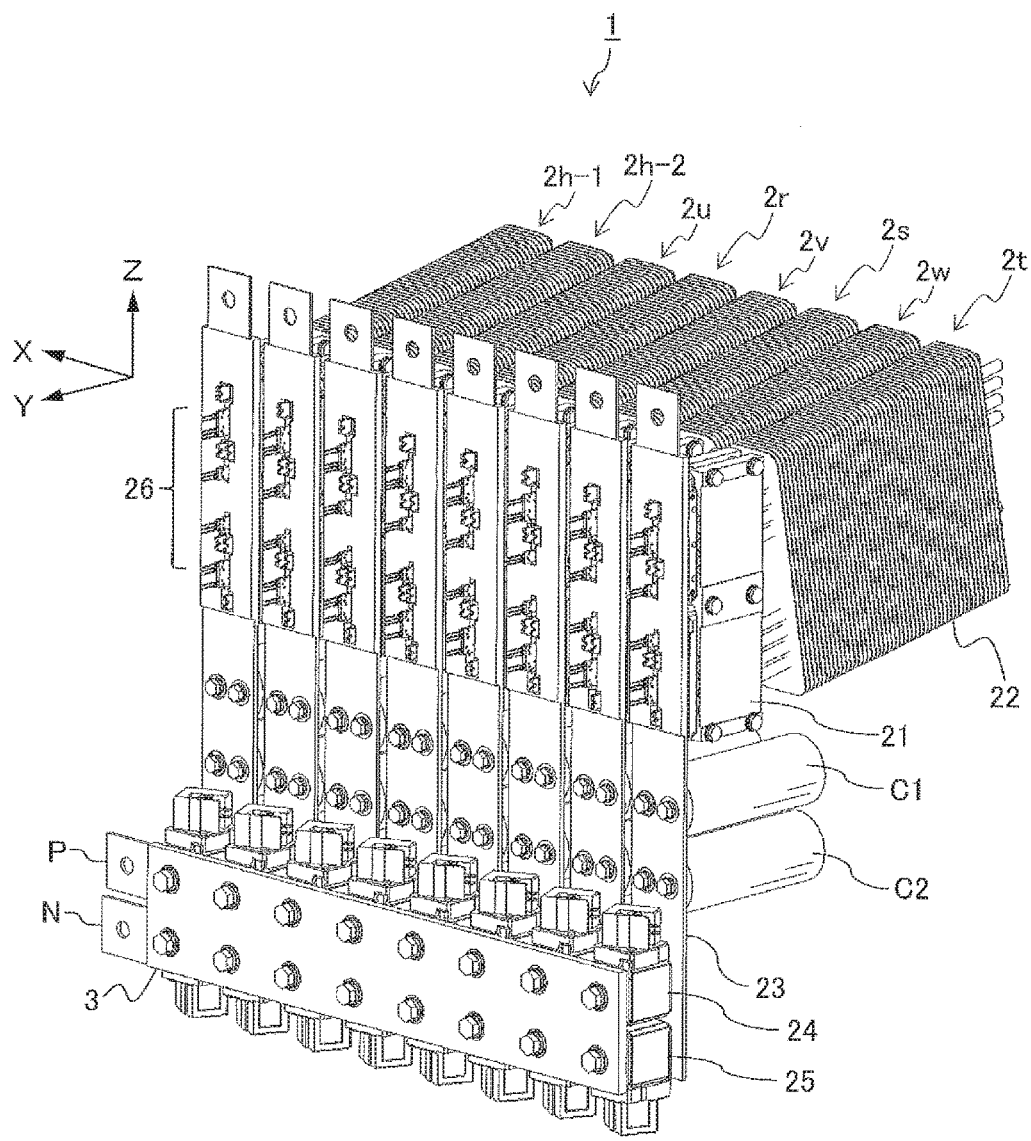
FIG. 1 is a perspective view showing a structure of an uninterruptible power-supply system in a first embodiment.

FIG. 1 is a perspective view showing the structure of an uninterruptible power-supply system 1 in a first embodiment.

Figure 2:
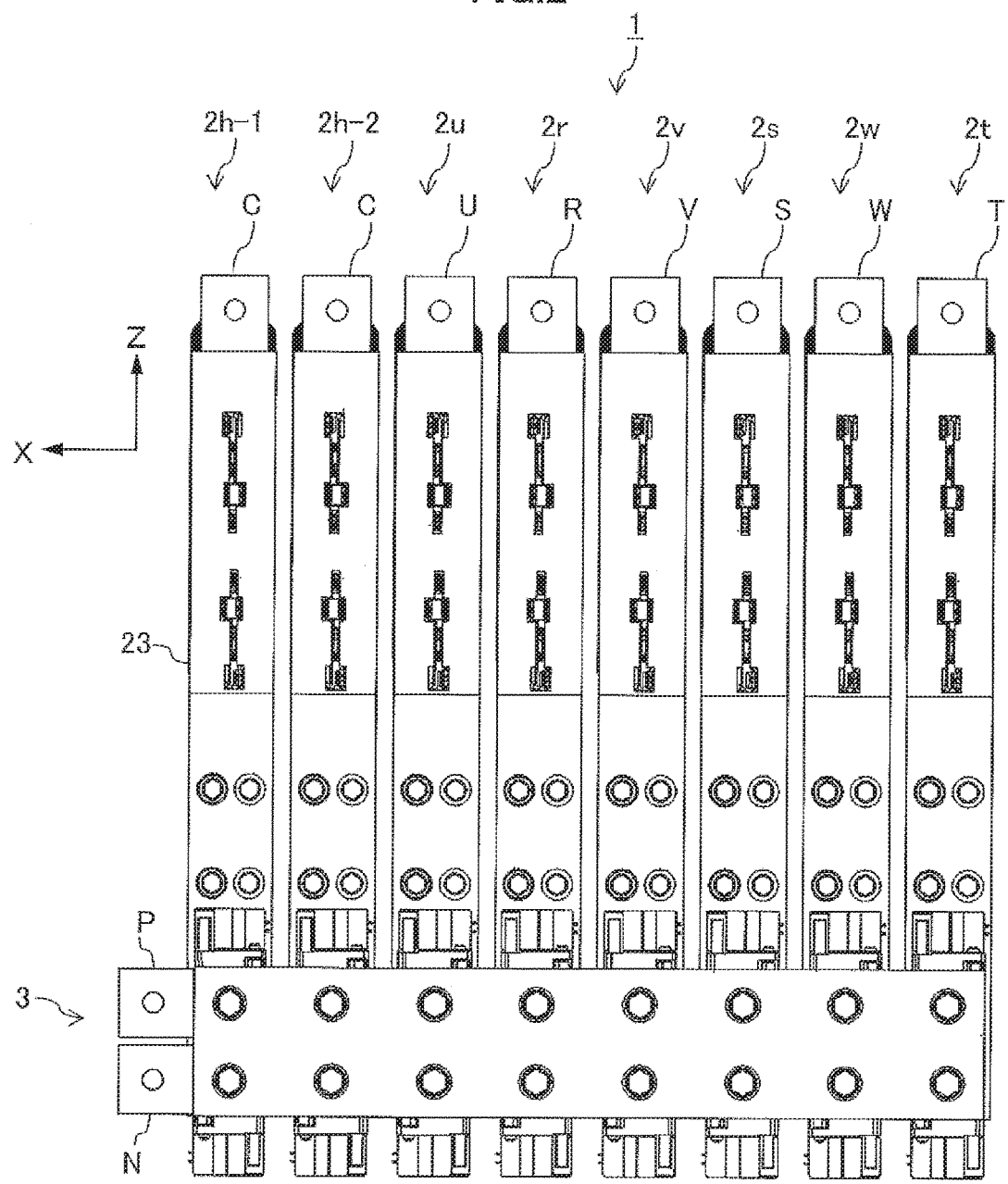
FIG. 2 is a top view showing the structure of the uninterruptible power-supply system in the first embodiment.

As shown in FIG. 1 and FIG. 2, the uninterruptible power-supply system 1 is configured by connecting power conversion units 2r, 2s, 2t, 2u, 2v, 2w, 2h-1, 2h-2, which have the same structure and are connected by a PN laminated busbar 3. A PN laminated busbar 3 is a laminated conductor formed by lamination of conductors. Hereinafter, when respective power conversion units are not particularly distinguished, a power conversion unit may be merely referred to as a power conversion unit 2.

In a power conversion unit 2, a power semiconductor module 21 provided with cooling fins 22, capacitors C1, C2, and fuse elements 24, 25 are assembled to a main circuit busbar 23, which is a PN•AC laminated busbar. The power semiconductor module 21 is provided with control signal terminals 26.

FIG. 2 is a top view showing the structure of the uninterruptible power-supply system 1 in the first embodiment.

Three power conversion units 2r, 2s, and 2t are for R-phase, S-phase, and T-phase, respectively. The main circuit busbar 23 of the power conversion unit 2r is provided with an R-terminal at the upper portion. The main circuit busbar 23 of the power conversion unit 2s is provided with an S-terminal at the upper portion. The main circuit busbar 23 of the power conversion unit 2t is provided with a T-terminal at the upper portion. These R-terminal, S-terminal, and T-terminal are AC•DC terminals of the power conversion units 2r, 2s, and 2t.

The three power conversion units 2u, 2v, and 2w are for U-phase, V-phase, and W-phase of the inverter, respectively. The main circuit busbar 23 of the power conversion unit 2u is provided with a U-terminal at the upper portion. The main circuit busbar 23 of the power conversion unit 2v is provided with a V-terminal at the upper portion. The main circuit busbar 23 of the power conversion unit 2w is provided with a W-terminal at the upper portion. These U-terminal, V-terminal, and W-terminal are AC•DC terminals of the power conversion units 2u, 2v, and 2w.

Further, as shown in FIG. 1 and FIG. 2, corresponding phases of the inverter and the converter are disposed adjacent to each other in parallel. The corresponding phases of the inverter and the converter in the first embodiment are U-phase of the inverter and R-phase of the converter, V-phase of the inverter and S-phase of the converter, and W-phase of the inverter and T-phase of the converter.

The power conversion unit 2u of U-phase of the inverter and the power conversion unit 2r of R-phase of the converter are disposed adjacent to each other in parallel. The power conversion unit 2v of V-phase of the inverter and the power conversion unit 2s of S-phase of the converter are disposed adjacent to each other in parallel. The power conversion unit 2w of W-phase of the inverter and the power conversion unit 2t of T-phase of the converter are disposed adjacent to each other in parallel.

By this structure, impedances between corresponding phases can be minimized, and ripple currents flowing to the capacitors C1 and C2 of the respective power conversion units 2 can be reduced.

The two power conversion units 2h-1 and 2h-2 are connected in parallel to form a part of the chopper. The main circuit busbars 23 of the power conversion units 2h-1 and 2h-2 are provided with a C-terminal at the upper portion. These C-terminals are AC•DC terminals of the power conversion units 2h-1 and the 2h-2. For the chopper of the uninterruptible power-supply system 1 in the first embodiment, the two power conversion units 2h-1 and 2h-2 are connected in parallel to thereby double the allowable power. It is thus possible to handle even a case that the power required by the chopper exceeds the rated power of the individual power semiconductor modules 21 of individual power semiconductor modules 21.

Incidentally, the uninterruptible power-supply system 1 may be arranged such that plural power conversion units 2 are likewise connected in parallel also for the respective phases of the converter and the inverter.

Figure 3:
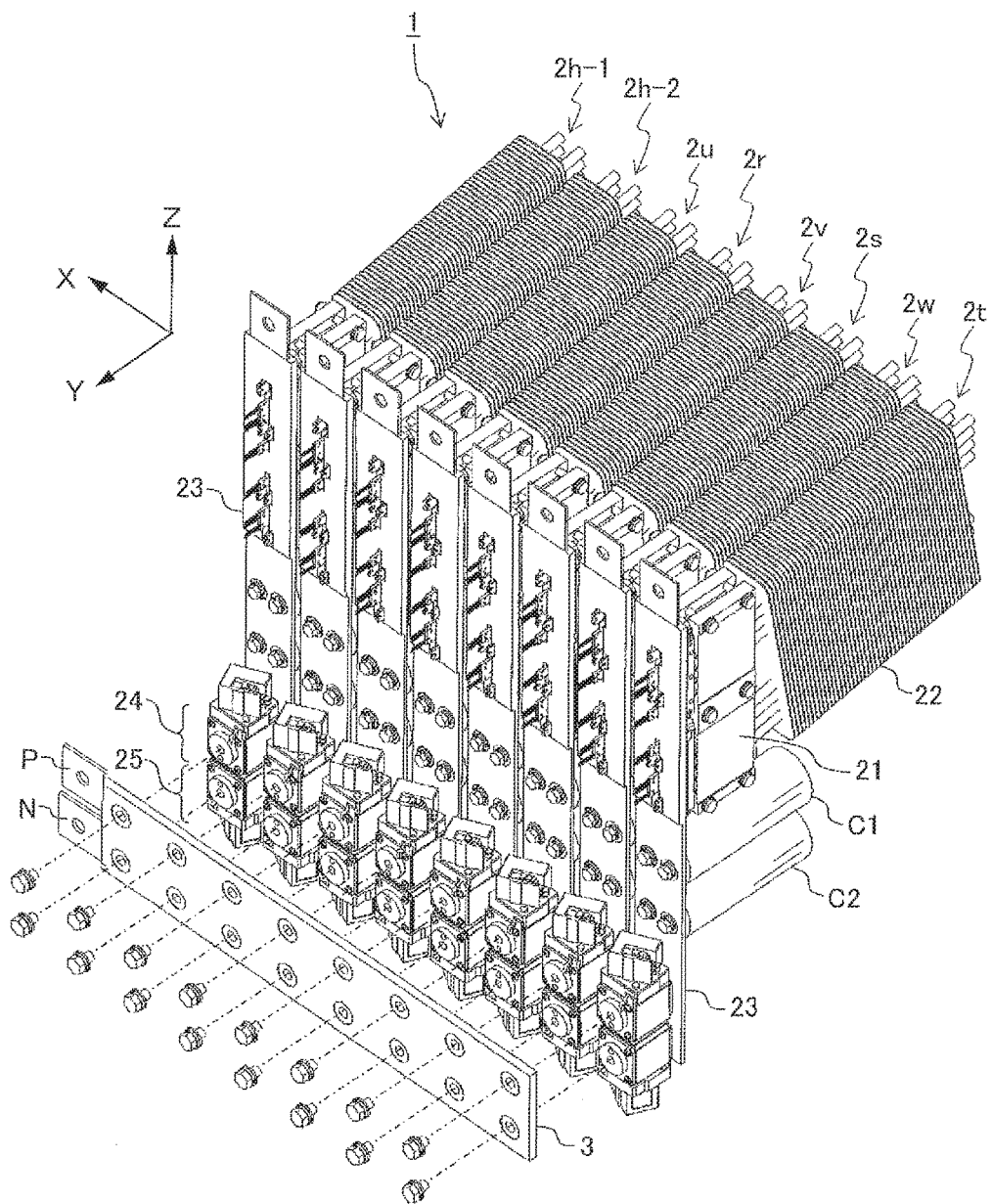
FIG. 3 is an exploded perspective view showing the structure of the uninterruptible power-supply system in the first embodiment.

FIG. 3 is an exploded view showing the structure of the uninterruptible power-supply system 1 in the first embodiment.

As shown in FIG. 3, the P-terminal (positive terminal) of the each power conversion unit 2 is screw-engaged on the P-side of the PN laminated busbar 3 to be thus electrically connected. The P-terminal (positive terminal) of the each power conversion unit 2 is screw-engaged on the N-side of the PN laminated busbar 3 to be thus electrically connected. For the uninterruptible power-supply system 1, the power conversion units 2 of the respective phases are formed in the same shape, the P-terminals and the N-terminals are aligned on the same plane, and the respective P-terminals and the N-terminals are respectively electrically connected by the PN laminated busbar 3 so that the interphase impedances can be reduced.

The PN laminated busbar 3 is disposed on the same side surface plane of the respective main circuit busbars 23. The PN laminated busbar 3 is screw-engaged to the fuse elements 24, 25, which are screw-engaged to the side surfaces of the respective main circuit busbars 23. The PN laminated busbar 3 can thereby mechanically fix the power conversion unit 2.

Figure 4:
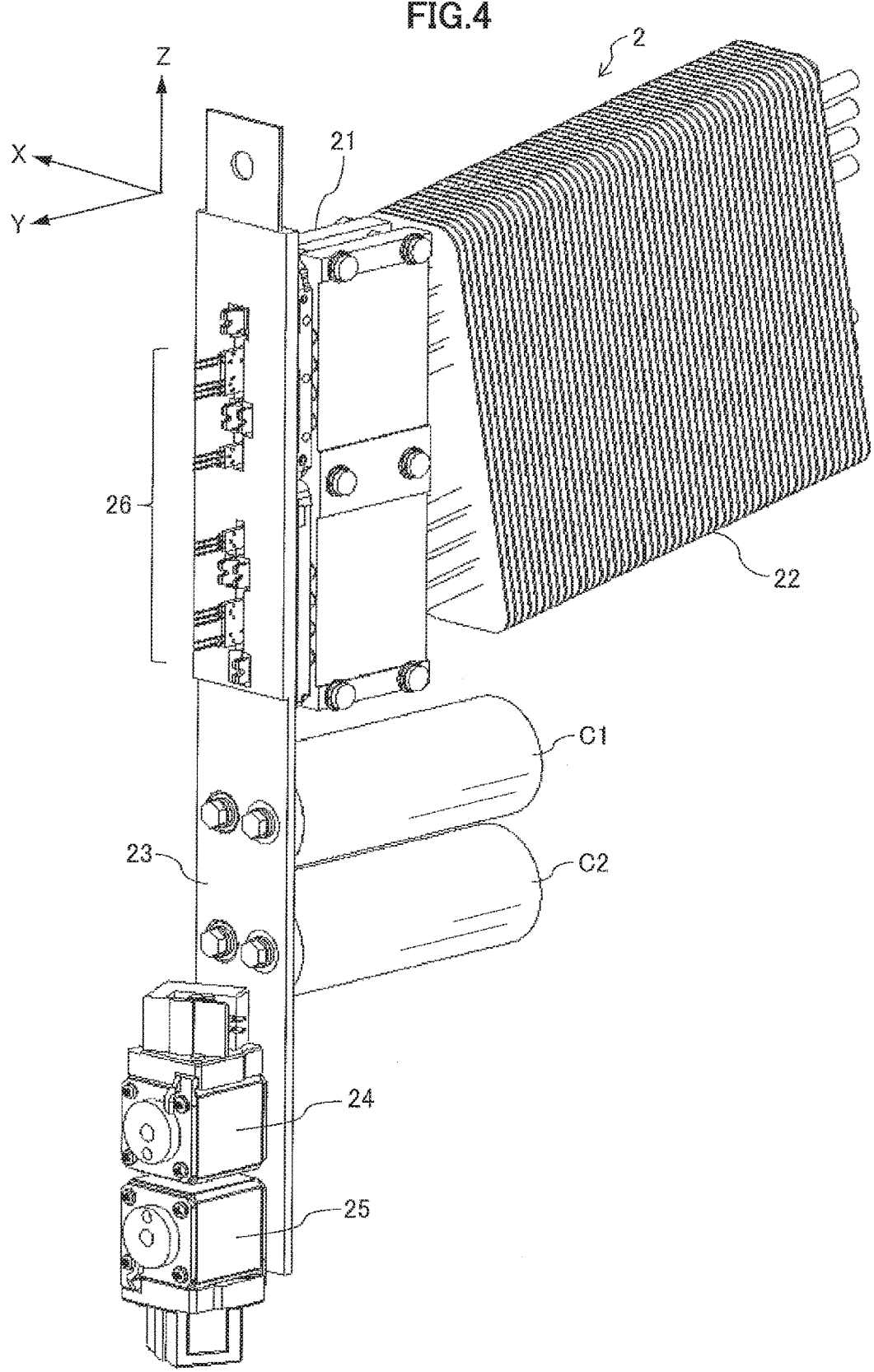
FIG. 4 is a perspective view showing the structure of a power conversion unit in the first to fifth embodiments.

FIG. 4 is a perspective view showing the structure of the uninterruptible power-supply system 1 in the first to fifth embodiments.

Figure 5:
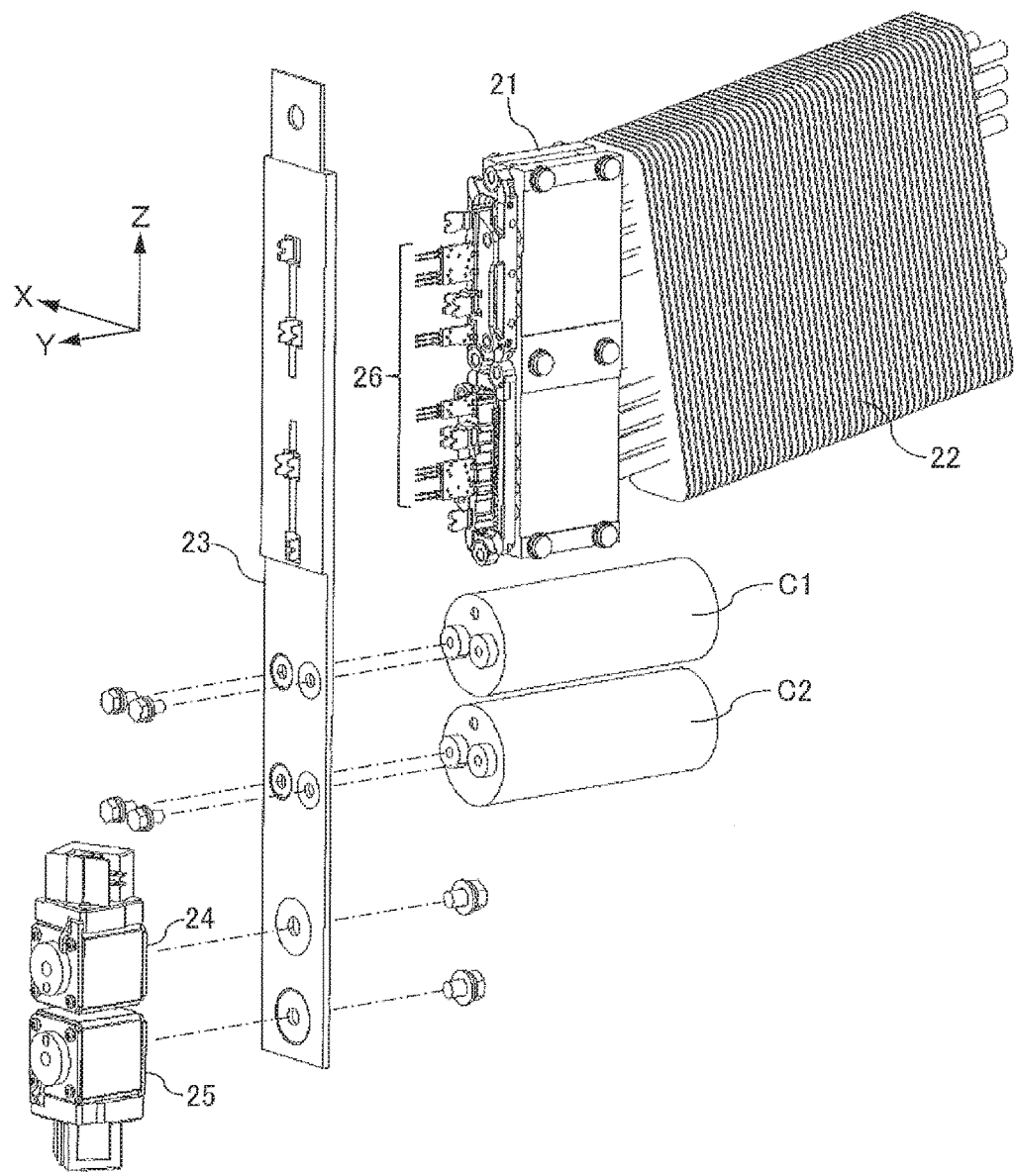
FIG. 5 is an exploded perspective view showing the structure of the power conversion unit in the first embodiment.

FIG. 5 is an exploded view showing the structure of the uninterruptible power-supply system 1 in the first embodiment.

As shown in FIG. 4 and FIG. 5, a power conversion unit 2 is structured by a power semiconductor module 21, cooling fins 22, capacitors C1, C2, fuse elements 24, 25, and a main circuit busbar 23.

The P-terminal of the fuse element 24 is screw-engaged with the P-pole busbar of the main circuit busbar 23 to be electrically connected. The N-terminal of the fuse element 25 is screw-engaged to the N-pole busbar of the main circuit busbar 23 to be electrically connected.

The AC•DC terminals of the power semiconductor modules 21 are electrically connected to the AC-pole busbars of the main circuit busbars 23 and connected as the terminals U, V, W, R, S, T, C to outside.

Further, the each power semiconductor module 21 is provided with control signal terminals 26. The control signal terminals 26 are connected with a higher level control circuit.

As in the uninterruptible power-supply system 1, by arranging the respective power conversion units 2r, 2s, 2t, 2u, 2v, 2w, 2h-1, 2h-2, which structure a converter, an inverter, and a chopper, by the same part, the development cost can be reduced and advantages of reduction of fixed cost including cost for maintenance of parts control and a manufacturing line can also be obtained.

Figure 6:
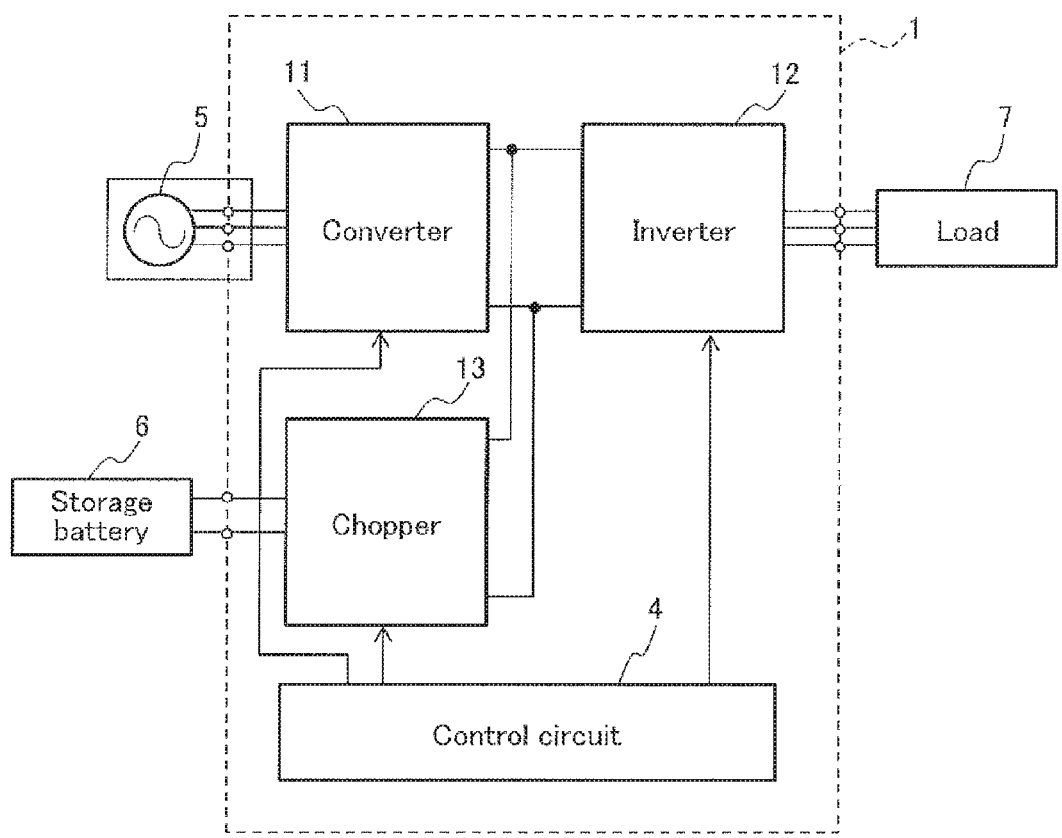
FIG. 6 is a block diagram showing an uninterruptible power-supply system.

FIG. 6 is a schematic structure diagram showing the uninterruptible power-supply system 1.

As shown in FIG. 6, the uninterruptible power-supply system 1 is provided with a converter 11, an inverter 12, a chopper 13, and a higher level control circuit 4 that controls these.

The converter 11 is a three-phase converter that converts a three-phase AC power supplied from a commercial power source 5 into a DC power and supplies the DC power to the inverter 12 and the chopper 13.

The inverter 12 is a three-phase inverter that again converts the DC power into a three-phase AC power and supplies the AC power to a load 7.

The chopper 13 increases or decreases the voltage of the DC power to a certain voltage, and stores the DC power into a storage battery 6.

The control circuit 4 controls the converter 11, the inverter 12, and the chopper 13. Incidentally, the chopper 13 is not essential in the uninterruptible power-supply system 1.

In the event that the power of the commercial power source 5 has stopped, the chopper 13 supplies the power stored in the storage battery 6 to the inverter 12 as DC power. The inverter 12 converts this DC power into AC power to supply the AC power to the load 7. Thus, the uninterruptible power-supply system 1 can uninterruptedly supply power to the load 7.

Figure 7:
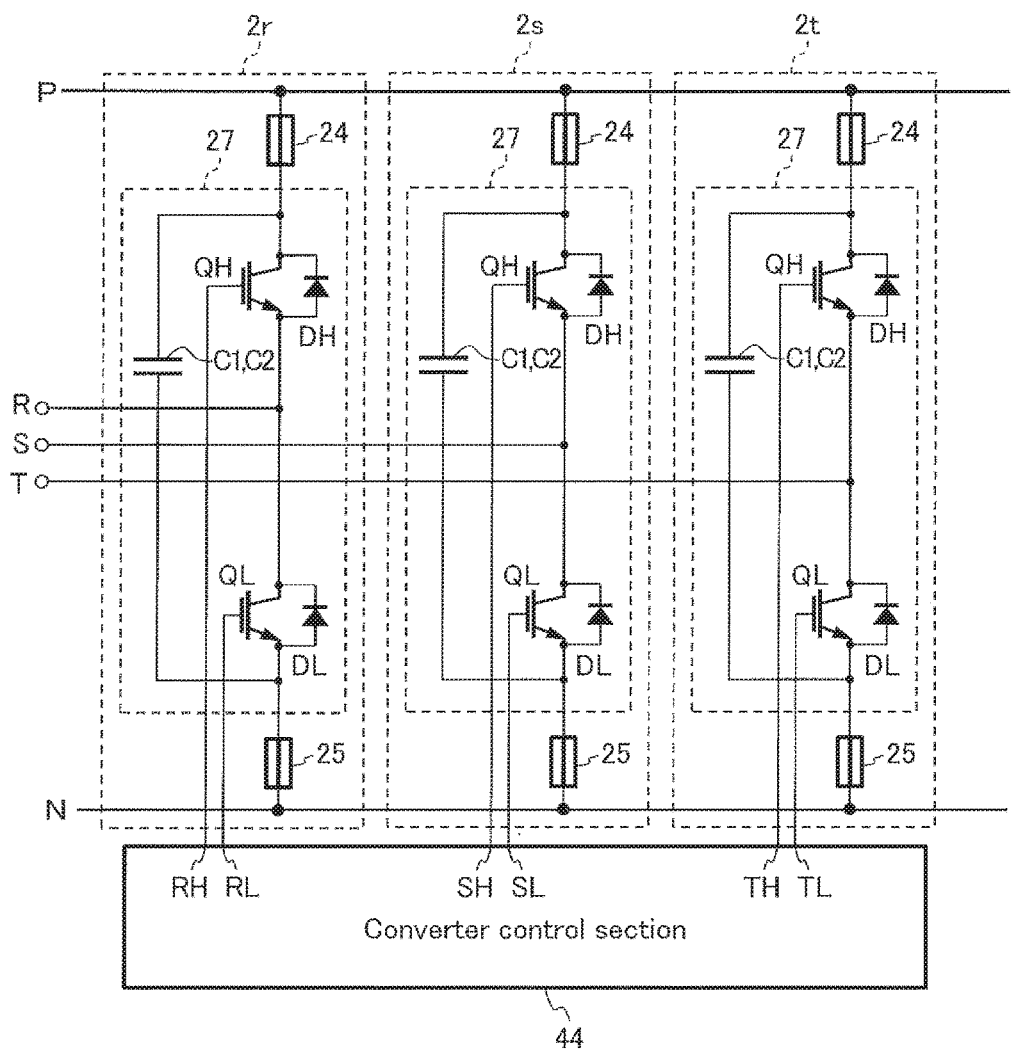
FIG. 7 is an equivalent circuit diagram showing a structure of a converter.

FIG. 7 is an equivalent circuit diagram showing the structure of the converter 11.

As shown in FIG. 7, the converter 11 is provided with the power conversion units 2r, 2s, and 2t, and is controlled by a converter control section 44. The converter 11 converts three-phase AC power supplied from the three-phase commercial power source 5 into DC power between the P-terminal and the N-terminal.

The power conversion unit 2r is provided with a switching element QH and a rectifying element DH for an upper arm, a switching element QL and a rectifying element DL for a lower arm, and fuse elements 24, 25. The switching element QH and the rectifying element DH for the upper arm and the switching element QL and the rectifying element DL for the lower arm form a half bridge circuit 27. As the switching elements QH and QL, IGBTs (Insulated Gate Bipolar Transistors) are used. As the rectifying elements DH and DL, diodes are used.

The fuse element 24 connects the P-side of the PN laminated busbar 3 and the collector of the switching element QH. The rectifying element DH is connected from the emitter of the switching element QH toward the collector. The emitter of the switching element QH is connected to the collector of the switching element QL and an AC terminal R. The capacitors C1 and the capacitor C2 are connected in parallel between the collector of the switching element QH and the emitter of the switching element QL. Incidentally, in the circuit diagram of FIG. 7, the parallel connection of the capacitor C1 and the capacitor C2 is omitted and is represented by a symbol of a single capacitor. The gate of the switching element QH is connected to the converter control section 44.

The fuse element 25 connects the emitter of the switching element QL and the N-side of the PN laminated busbar 3. The rectifying element DL is connected from the emitter of the switching element QL toward the collector. The gate of the switching element QL is connected to the converter control section 44.

The power conversion unit 2s is structured similarly to the power conversion unit 2r except that the connection node between the emitter of the switching element QH and the collector of the switching element QL is connected to AC terminal S.

The power conversion unit 2t is structured similarly to the power conversion unit 2r except that the connection node between the emitter of the switching element QH and the collector of the switching element QL is connected to AC terminal T.

In the following, the operation of the converter 11 will be described, with reference to FIG. 7, as appropriate.

Three-phase AC power supplied from the commercial power source 5 is supplied through the AC terminals R, S, and T to the power conversion units 2r, 2s, and 2t of the respective phases of the converter 11. The switching timings of the switching elements QH and the rectifying elements DH for the upper arms of the power conversion units 2r, 2s, 2t, and the switching elements QL and the rectifying elements DL of the lower arms are control by the converter control section 44 to rectify the AC power.

Figure 8:
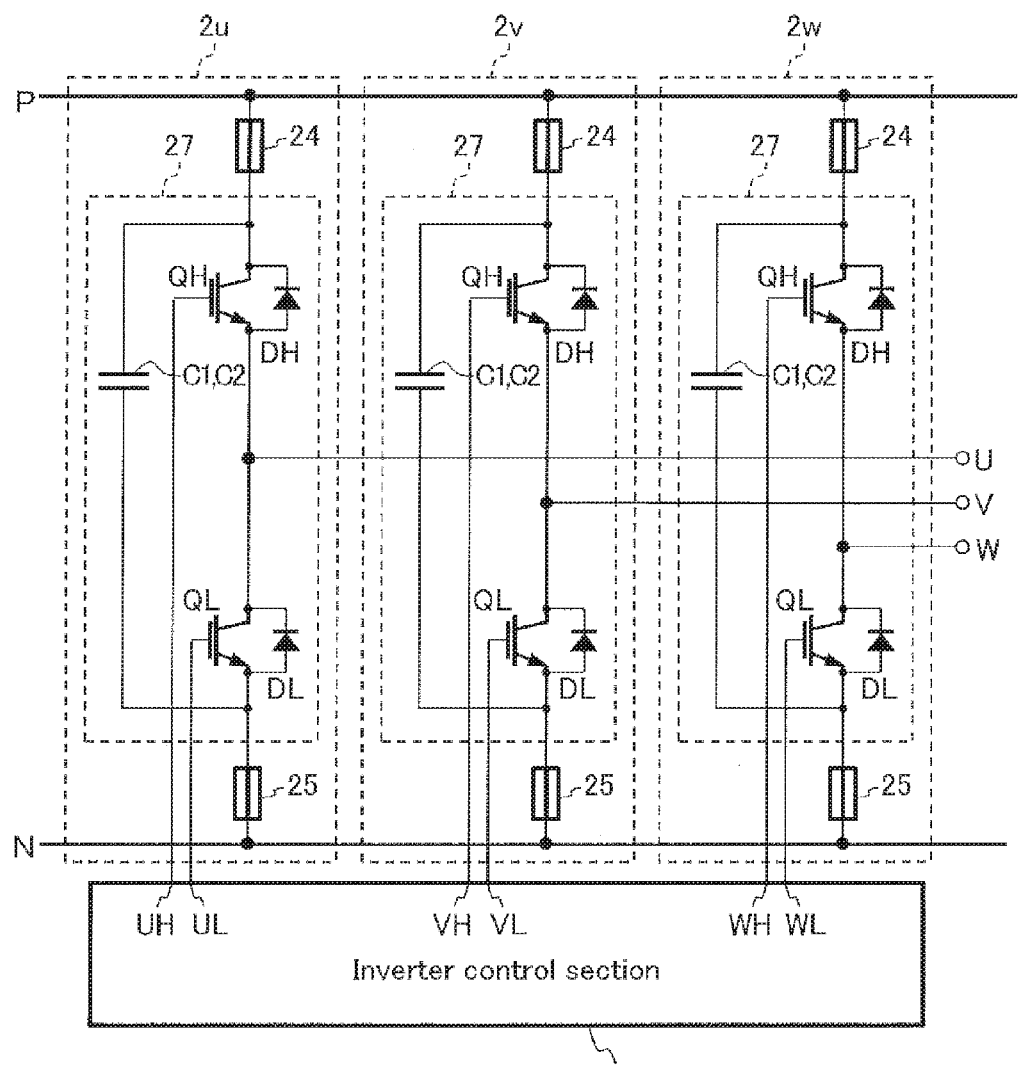
FIG. 8 is an equivalent circuit diagram showing a structure of an inverter.

FIG. 8 is an equivalent circuit diagram showing the structure of the inverter 12.

As shown in FIG. 8, the inverter 12 is provided with power conversion units 2u, 2v, 2w, and is further controlled by an inverter control section 43. The inverter 12 converts the DC power between the P-terminal and the N-terminal into three-phase AC power.

The power conversion unit 2u is structured similarly to the power conversion unit 2r (see FIG. 7) except that the connecting node between the emitter of the switching element QH and the collector of the switching element QL is connected to an AC terminal U.

The power conversion unit 2v is structured similarly to the power conversion unit 2r (see FIG. 7) except that the connecting node between the emitter of the switching element QH and the collector of the switching element QL is connected to an AC terminal V.

The power conversion unit 2w is structured similarly to the power conversion unit 2r (see FIG. 7) except that the connecting node between the emitter of the switching element QH and the collector of the switching element QL is connected to an AC terminal W.

Thus, power conversion units 2 are commonalized and it is thereby possible to reduce the number of kinds of parts or components.

In the following, the operation of the inverter 12 will be describe, with reference to FIG. 8, as appropriate.

The DC power converted by the converter 11 is supplied between the P-terminal and the N-terminal. The switching timings of the switching elements QH and the rectifying elements DH of the upper arms, and the switching elements QL and the rectifying elements DL, of the lower arms of the power conversion units 2u, 2v, and 2w are controlled by the inverter control section 43 to convert this DC power into AC power and output the AC power to the AC terminals U, V, and W.

Figure 9:
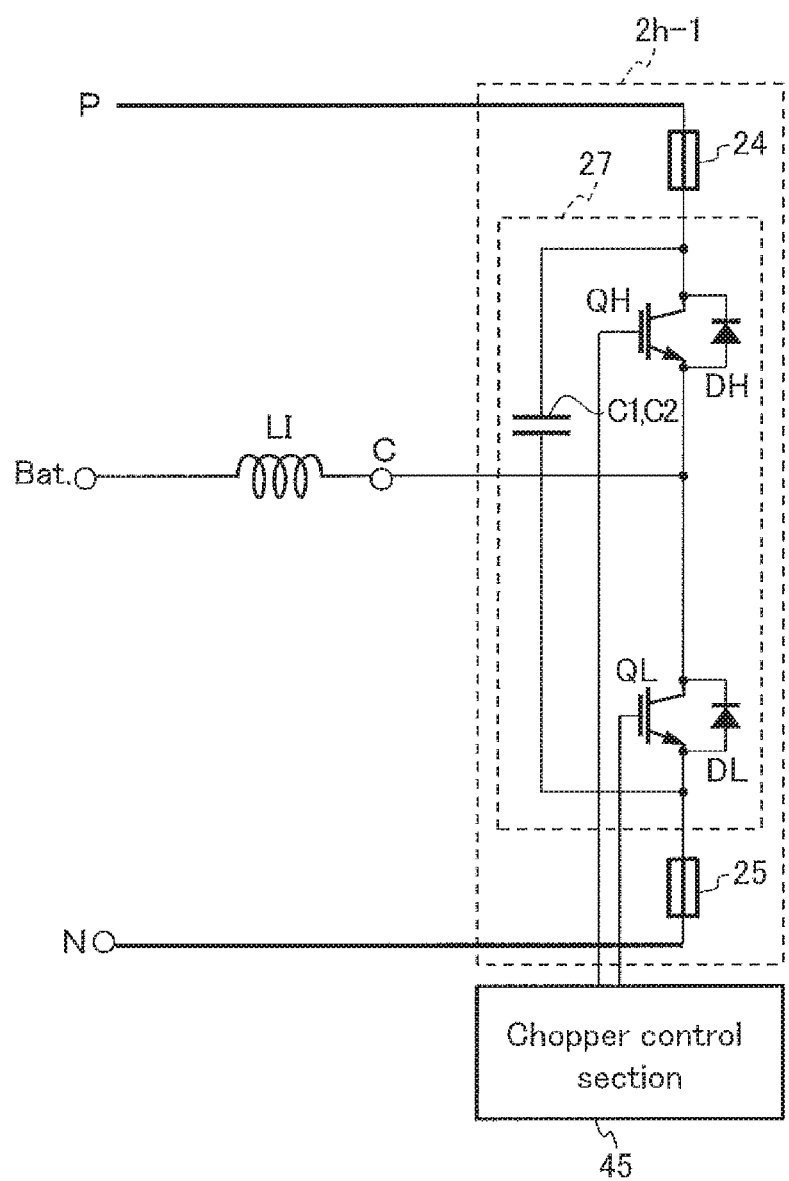
FIG. 9 is an equivalent circuit diagram showing a structure of a chopper.

FIG. 9 is an equivalent circuit diagram, showing the structure of the chopper 13.

As shown in FIG. 9, the chopper 13 is provided with the power conversion unit 2h-1 and a reactor L1, and controlled by a chopper control section 45. The chopper 13 converts low DC voltage by the storage battery 6 and high DC voltage between the P-terminal and the N-terminal with each other.

The power conversion unit 2h-1 is structured similarly to the power conversion unit 2r (see FIG. 7) except that the connecting node between the emitter of the switching element QH and the collector of the switching element QL is connected to a terminal C. Thus, power conversion units 2 are commonalized and it is thereby possible to reduce the number of kinds of parts or components.

The reactor L1 connects the positive pole of the storage battery 6 and the terminal C.

In the following, the operation of the chopper 13 will be described, with reference to FIG. 9, as appropriate.

While the lower arm of the power conversion unit 2h-1 is ON, energy is accumulated in the reactor L1 connected between the storage battery 6 and the terminal C. Then, when the switching element QL has turned OFF, the rectifying element DH for the upper arm turns ON by a reverse voltage generated by the reactor L1. Consequently, at the output end of the chopper 13, a voltage, which is the total of the DC voltage of the storage battery 6 and the reverse voltage of the reactor L1, is generated. The chopper 13 thereby increases the DC voltage of the storage battery 6. The chopper control section 45 can arbitrarily set the boost ratio by controlling the switching timing of the power conversion unit 2h-1.

As described above, each of the converter 11, the inverter 12, and the chopper 13 has basic structure by the two-level half bridge circuit 27 in which the switching element QH and the rectifying element DH of the upper arm and the switching element QL, and the rectifying element DL of the lower arm, are serially connected.

In the following, a ripple current reduction effect according to the present embodiment will be described.

Figure 10:
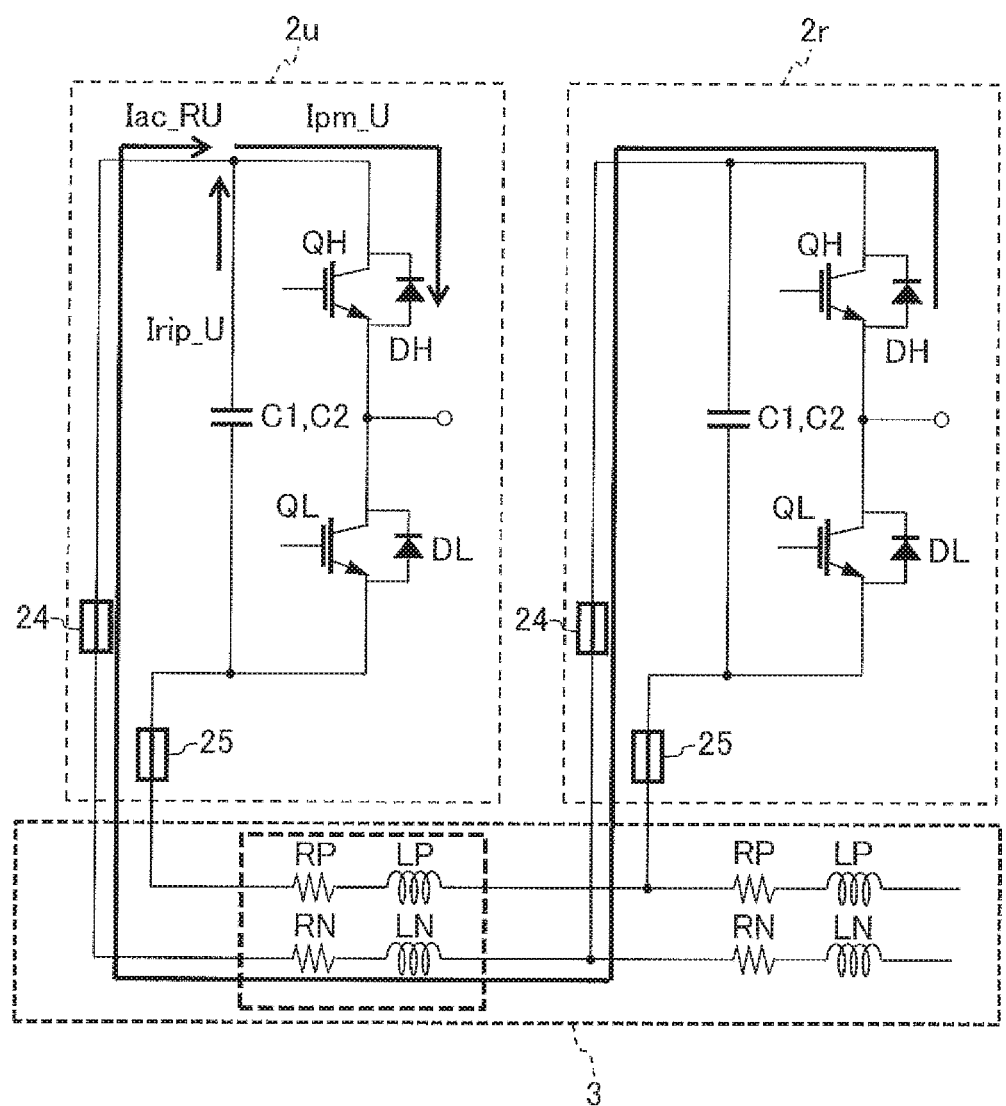
FIG. 10 is an equivalent circuit diagram showing the uninterruptible power-supply system in the first embodiment.

FIG. 10 is an equivalent circuit diagram showing a power conversion section in the first embodiment.

As shown in FIG. 10, the power conversion section is structured, for example, by the U-phase power conversion unit 2u of the inverter 12 and the R-phase power conversion unit 2r of the converter 11. The equivalent circuit between the P-terminal of the power conversion unit 2u and the P-terminal of the power conversion unit 2r is represented by serial connection of a resistor RP and a coil LP. The equivalent circuit between the N-terminal of the power conversion unit 2u and the N-terminal of the power conversion unit 2r is represented by serial connection of a resistor RN and a coil LN. The serial connection of the resistor RP and the coil LP, and the serial connection of a resistor RN and the coil LN has an interphase impedance.

For the power conversion section, by disposing the power conversion unit 2u and the power conversion unit 2r adjacent to each other, the wire between two phases can be shortened and the interphase impedance can be thereby reduced. The P-terminal of the power conversion unit 2u for the U-phase of the inverter 12 is adjacently connected through the PN laminated busbar 3 to the P-terminal of the power conversion unit 2r for the R-phase corresponding to it. The N-terminal of the power conversion unit 2u is adjacently connected through the PN laminated busbar 3 to the N-terminal of the power conversion unit 2r for the R-phase corresponding to it.

In reverse proportion to the decrease in this interphase impedance, the sneak current Iac_RU, which is from the power semiconductor module 21 of the power conversion unit 2r to the power conversion unit 2u, becomes high.

Herein, the ripple current Irip_U of the capacitors C1, C2 of the power conversion unit 2u is the difference between the current Ipm_U drawn in by the power semiconductor module 21 of the power conversion unit 2r and the sneak current Iac_RU.

Accordingly, by reducing the interphase impedance and increasing the sneak current Iac_RU, the current Ipm_U drawn in by the power semiconductor module 21 and the sneak current Iac_RU are made equal to each other. Further, the switching timings of the inverter 12 and the converter 11 are controlled so that the phase of the current Ipm_U and the phase of the sneak current Iac_RU become equal to each other. Thus, the ripple current Irip_U, which is the difference between the current Ipm_U and the sneak current Iac_RU, can be reduced.

Figure 11:
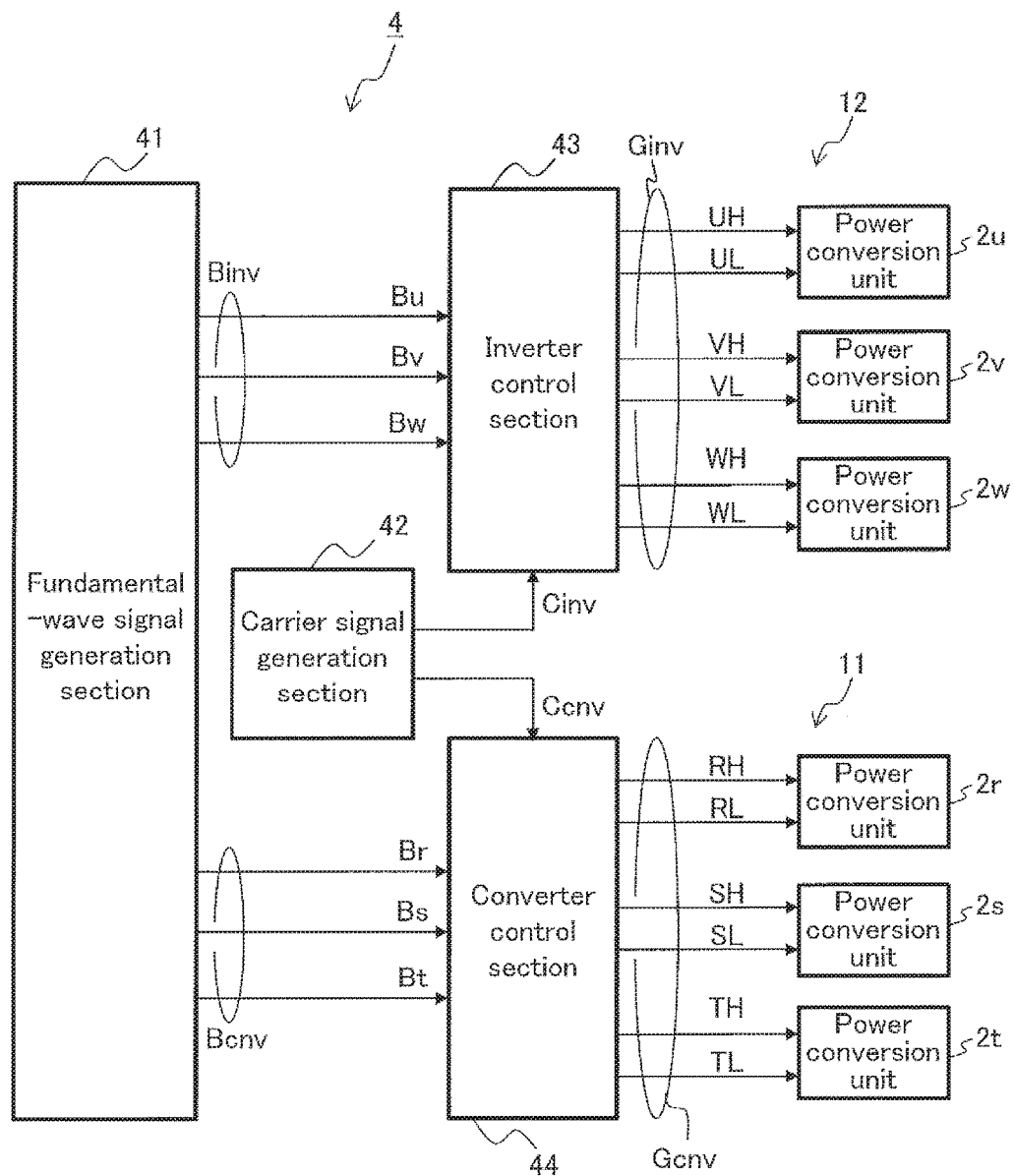
FIG. 11 is a structure diagram showing the control system of the uninterruptible power-supply system in the first embodiment.

FIG. 11 is a structure diagram showing the control system of the uninterruptible power-supply system 1 in the first embodiment.

The control circuit 4 is structured by a fundamental-wave signal generation section 41, a carrier signal generation section 42, an inverter control section 43, and a converter control section 44. The converter control section 44 controls the inverter 12, the inverter 11, and the chopper 13.

The fundamental-wave signal generation section 41 generates an inverter three-phase fundamental-wave signal Binv and a converter three-phase fundamental-wave signal Bcnv such that these signals synchronize at the same frequency and with a certain phase difference. The inverter three-phase fundamental-wave signal Binv generated by the fundamental-wave signal generation section 41 includes a U-phase fundamental-wave signal Bu, a V-phase fundamental-wave signal Bv, and a W-phase fundamental-wave signal Bw which are supplied to the inverter control section 43.

The carrier signal generation section 42 is a triangular wave signal generation section that generates an inverter carrier signal Cinv, which is a triangular wave signal of the inverter, and a converter carrier signal Ccnv, which is a triangular wave signal of the converter. The carrier signal generation section 42 generates an inverter carrier signal Cinv and a converter carrier signal Ccnv such that these signals synchronize at the same frequency and with a certain phase difference.

The inverter control section 43 generates a three-phase PWM signal of the inverter 12. The inverter control section 43 compares by a comparator, not shown, an inverter carrier signal Cinv, which is input from the carrier signal generation section 42, and an inverter three-phase fundamental-wave signal Binv, and generates an inverter three-phase control signal Ginv. The inverter three-phase control signal Ginv is a PWM signal and includes U-phase control signals UH, UL, V-phase control signals VH, VL, and W-phase control signals WH, WL.

The U-phase control signals UH, UL are input to the gates of the switching elements QH, QL of the U-phase power conversion unit 2u. The V-phase control signals VH, VL are input to the gates of the switching elements QH, QL of the V-phase power conversion unit 2v. The W-phase control signals WH, WL are input to the gates of the switching elements QH, QL of the W-phase power conversion unit 2w.

The converter three-phase fundamental-wave signal Bcnv generated by the fundamental-wave signal generation section 41 includes a R-phase fundamental-wave signal Br, an S-phase fundamental-wave signal Bs, and a T-phase fundamental-wave signal Bt and is supplied to the converter control section 44.

The converter control section 44 generates a three-phase PWM signal of the converter 11. The converter control section 44 compares the converter carrier signal Ccnv, which is input from the carrier signal generation section 42, and the inverter three-phase fundamental-wave signal Binv, by a comparator, not shown, and generates a converter three-phase control signal Gcnv. The converter three-phase control signal Gcnv is a PWM signal and includes an R-phase control signals RH, RL, S-phase control signals SH, SL, and T-phase signals TH, TL.

The R-phase control signals RH, RL are input to the gates of the switching elements QH, QL of the R-phase power conversion unit 2r. The S-phase control signals SH, SL are input to the gates of the switching elements SH, SL of the S-phase power conversion unit 2s. The T-phase control signals TH, TL are input to the gates of the switching elements QH, QL of the T-phase power conversion unit 2t.

Figure 12A:
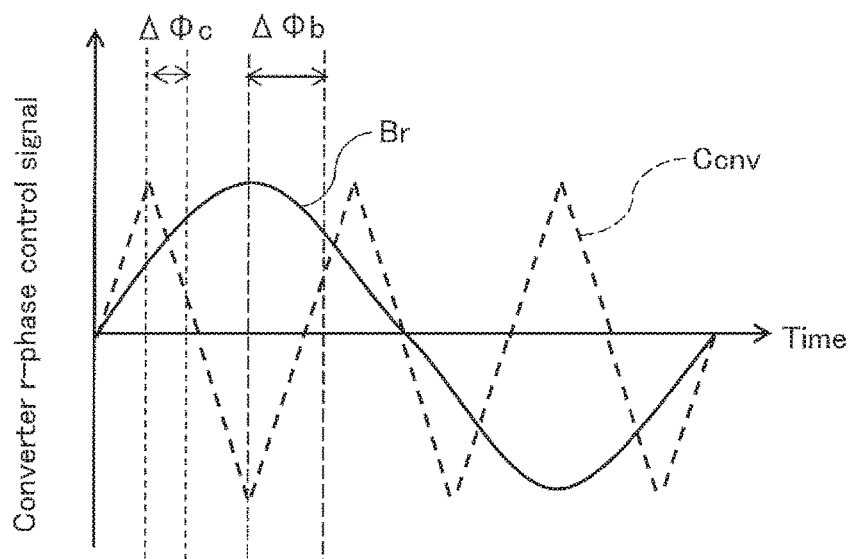
FIGS. 12A and 12B are waveform diagrams showing control signals during asynchronous state of the uninterruptible power-supply system in the first embodiment.
Figure 12B:
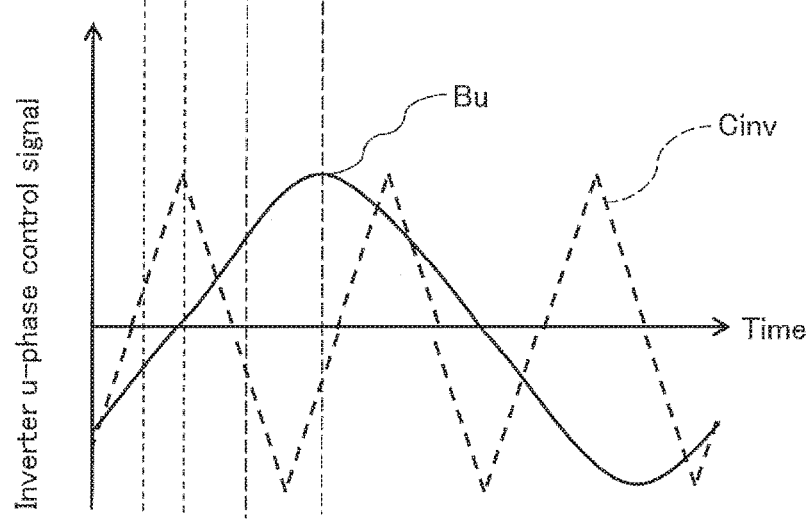

FIGS. 12A and 12B are waveform diagrams showing control signals during asynchronous state of the uninterruptible power-supply system 1 in the first embodiment.

The upper graphs show respective signal waveforms related to the R-phase control signals of the converter 11. The solid curve shows the R-phase fundamental-wave signal Br. The dashed curve shows the converter carrier signal Ccnv.

The lower graphs show the respective signal waveforms related to the U-phase control signals of the inverter 12. The solid curve shows the U-phase fundamental-wave signal Bu. The dashed curve shows the inverter carrier signal Cinv.

In FIGS. 12A and 12B, the R-phase fundamental-wave signal Br of the converter 11 and the U-phase fundamental-wave signal Bu of the inverter 12 are shifted from each other by phase difference ΔΦb. In the following description, the phase difference between the R-phase fundamental-wave signal Br and the U-phase fundamental-wave signal Bu will be defined as ΔΦb.

Further, the converter carrier signal Ccnv and the inverter carrier signal Cinv are shifted from each other in phase by ΔΦc. In the following description, the phase difference between the converter carrier signal Ccnv and the inverter carrier signal Cinv will be defined to be ΔΦc.

Figure 13A:
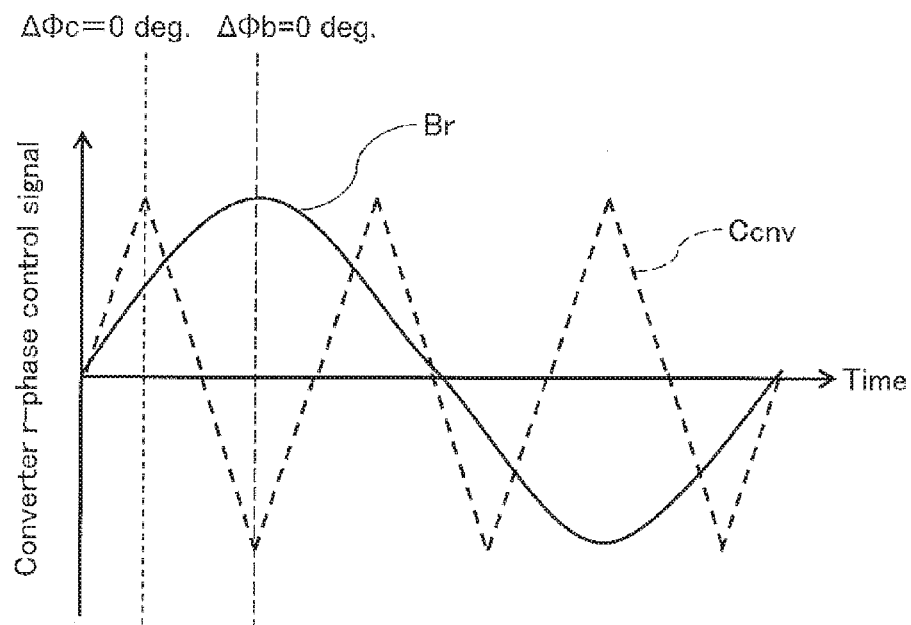
FIGS. 13A and 13B are waveform diagrams showing control signals during synchronous state of the uninterruptible power-supply system in the first embodiment.
Figure 13B:
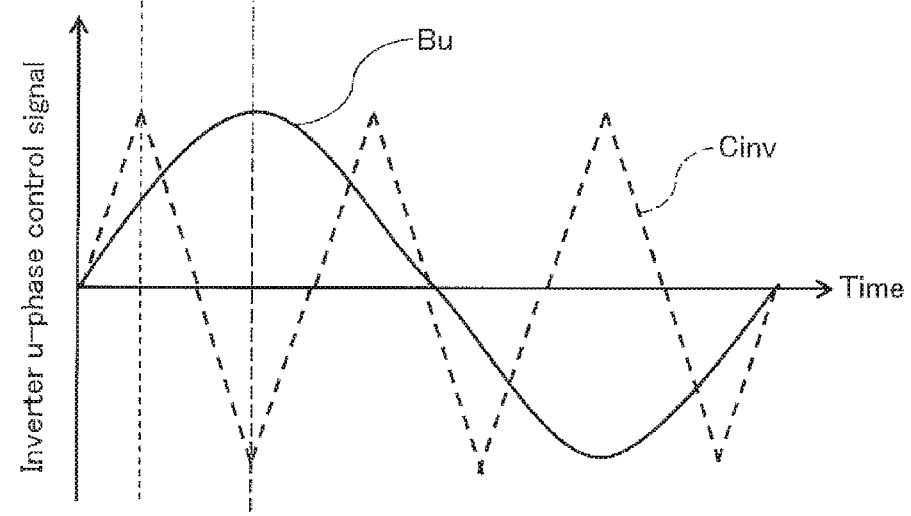

FIGS. 13A and 13B are waveform diagrams showing the control signal during synchronous state of the uninterruptible power-supply system 1 in the first embodiment. The vertical axis and the horizontal axis of the respective graphs in FIGS. 13A and 13B represent the same as in FIGS. 12A and 12B.

In FIGS. 13A and 13B, the R-phase fundamental-wave signal Br of the converter 11 and the U-phase fundamental-wave signal Bu of the inverter 12 are with the same phase and the phase difference ΔΦb is zero degree.

Further, the converter carrier signal Ccnv and the inverter carrier signal Cinv are with the same phase, and the phase difference ΔΦc is zero degree.

Figure 14:
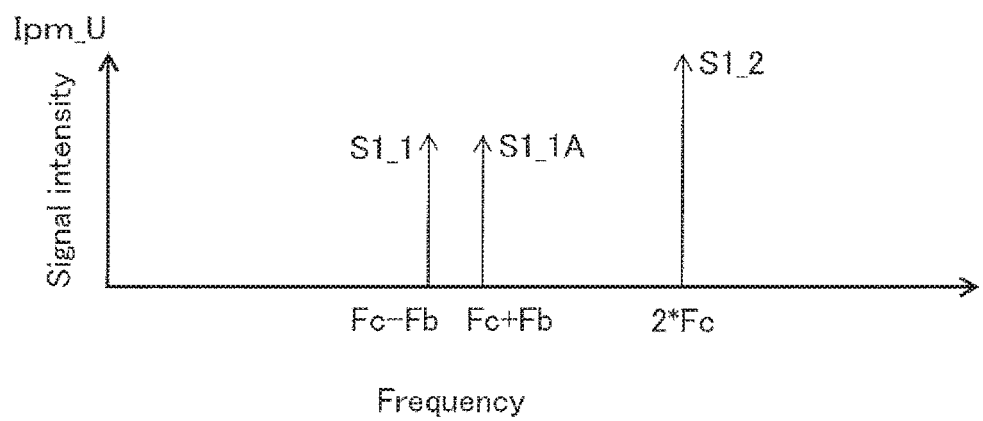
FIG. 14 is a frequency spectrum waveform diagram of the semiconductor module current of the uninterruptible power-supply system in the first embodiment.

FIG. 14 shows the frequency spectrum of the current Ipm_U of the power semiconductor module 21 of the uninterruptible power-supply system 1 in the first embodiment.

The current Ipm_U is a current drawn by the power semiconductor module 21 of the U-phase power conversion unit 2u of the inverter 12. The frequency spectrum of the current Ipm_U includes the signal component S1_1 of the difference frequency band between the carrier signal frequency Fc and the fundamental-wave signal frequency Fb, the signal component S1_1A of the total frequency band of the carrier signal frequency Fc and the fundamental-wave signal frequency Fb, and the signal component S1_2 of a double carrier signal frequency band.

Figure 15:
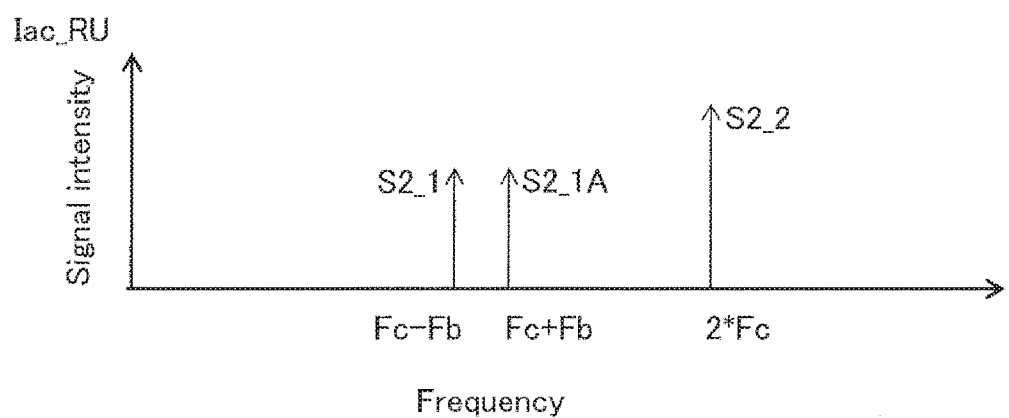
FIG. 15 is a frequency spectrum waveform diagram of the semiconductor module current of the uninterruptible power-supply system in the first embodiment.

FIG. 15 shows the frequency spectrum of the sneak current Iac_RU of the power semiconductor module 21 of the uninterruptible power-supply system 1 in the first embodiment.

The sneak current Iac_RU is a current that sneaks from the power semiconductor module 21 of the R-phase power conversion unit 2r of the converter 11 to the U-phase power conversion unit 2r of the inverter 12. The frequency spectrum of this sneak current Iac_RU includes a signal component S2_1 of the difference frequency band between the carrier signal frequency Fc and the fundamental-wave signal frequency Fb, the signal component S2_1A of the added frequency band of the carrier signal Fc and the fundamental frequency Fb, and the signal component S2_2 of the double carrier signal frequency band.

The phase difference between the signal component S1_1 and the signal component S2_1 is represented by the following Expression (1).

$$\Delta\Phi_{S1\_1-S2\_1}=\Delta\Phi_b-\Delta\Phi_c \quad (1)$$

The phase difference between the signal component S1_1A and the signal component S2_1A is represented by the following Expression (2).

$$\Delta\Phi_{S1\_1A-S2\_1A}=\Delta\Phi_b+\Delta\Phi_c \quad (2)$$

The phase difference between the signal component S1_2 and the signal component S2_2 is represented by the following Expression (3).

$$\Delta\Phi_{S1\_2-S2\_2}=2\times\Delta\Phi_c \quad (3)$$

As shown in FIG. 10, the ripple current Irip_U of the capacitors C1, C2 of the U-phase power conversion unit 2u of the inverter 12 is the difference between the current Ipm_U drawn in by the power semiconductor module 21 of the U-phase power conversion unit 2r of the converter 11 and the sneak current Iac_RU.

Accordingly, the ripple current Irip_U, which is the difference between the current Ipm_U and the sneak current Iac_RU, can be reduced by controlling the switching timings of the inverter 12 and the converter 11 in such a manner that the phases of the current Ipm_U and the current Iac_RU become the same phase, in other words, the phase difference ΔΦb and the phase difference by ΔΦc become zero degree.

Figure 16:
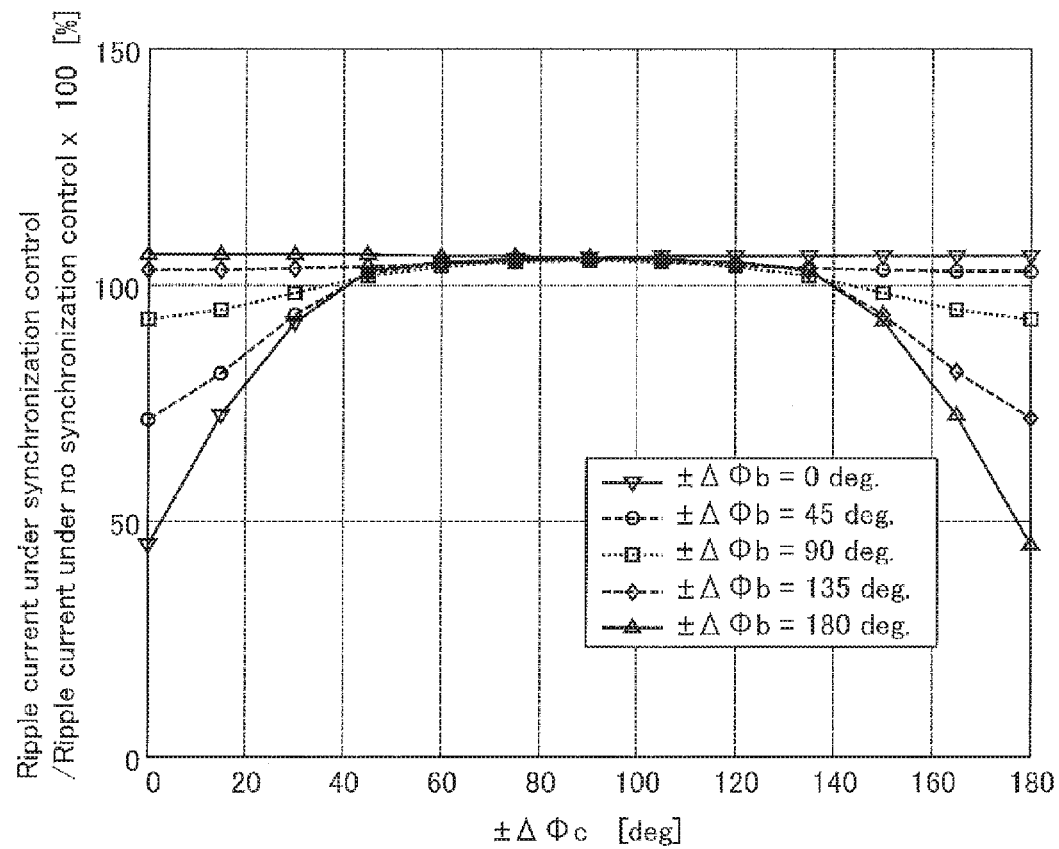
FIG. 16 is a diagram of graphs showing a ripple current reduction effect.

FIG. 16 shows graphs of the reduction effect of the ripple current.

Herein, shown is a ripple current Irip_U in a case where the phase difference ΔΦc and the phase difference ΔΦb are changed during three-phase PWM operation for triangular wave comparison, with a power factor of 1 and a modulation factor of 0.8, of the equivalent circuit shown in FIG. 10.

According to this, by performing synchronization control of the inverter 12 and the converter 11 in a range from −45 degrees to +45 degrees of the phase difference ΔΦb and in a range from −20 degrees to +20 degrees of the phase difference ΔΦc, the effect of reducing the ripple current can be attained.

Figure 17:
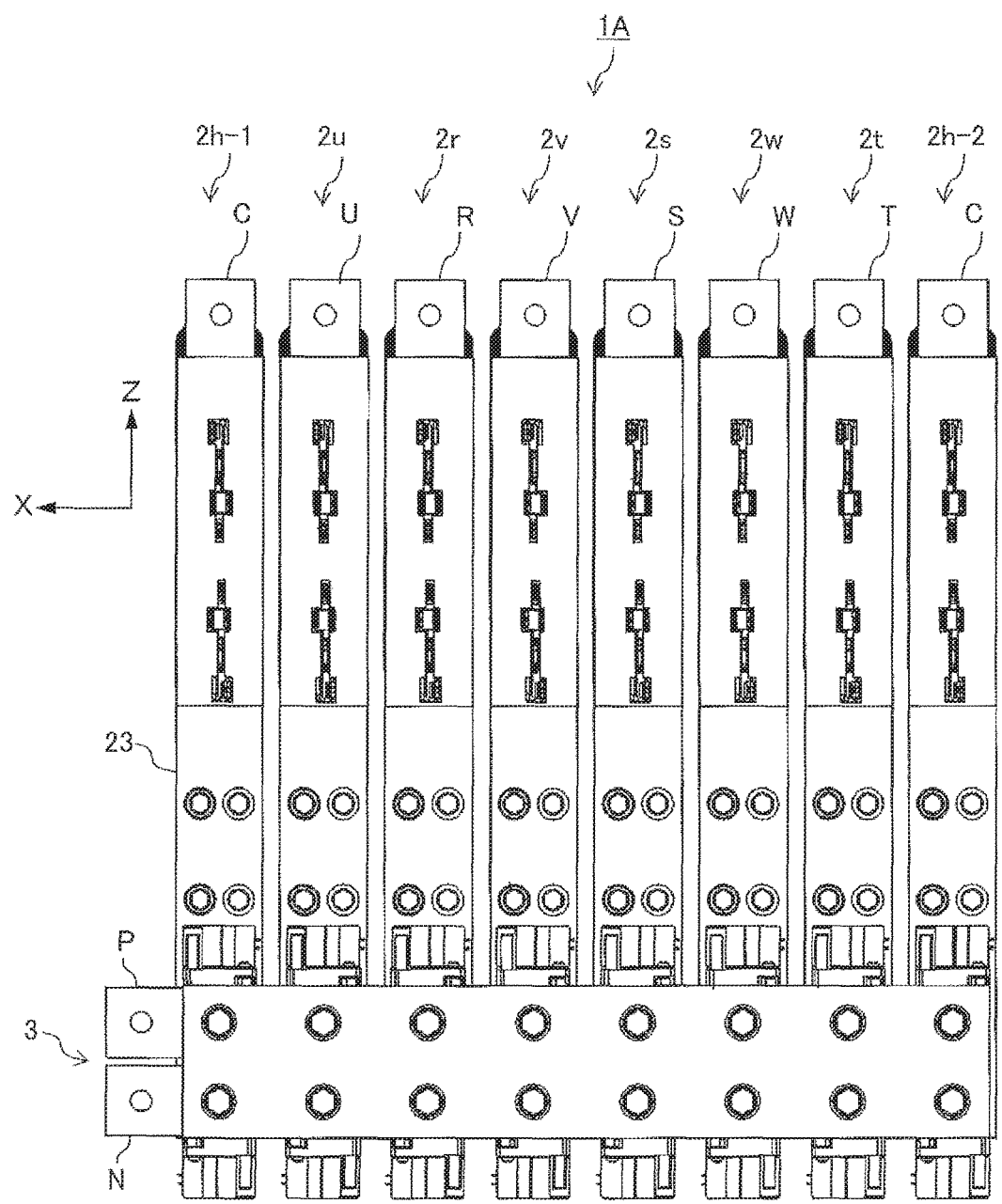
FIG. 17 is a top view showing a structure of an uninterruptible power-supply system in a second embodiment.

Further, the effect of reducing the ripple current can be likewise attained also by performing synchronization control of the inverter 12 and the converter 11 in a range from 135 degrees to 225 degrees of the phase difference ΔΦb and in a range from 160 degrees to 200 degrees of the phase difference ΔΦc, Second Embodiment FIG. 17 is a top view showing the structure of an uninterruptible power-supply system 1A in a second embodiment. The same symbol is given to an element that is the same as an element of the uninterruptible power-supply system 1 in the first embodiment shown in FIG. 2.

Differently from the uninterruptible power-supply system 1 (see FIG. 2) in the first embodiment, in the uninterruptible power-supply system 1A in the second embodiment, the power conversion units 2h-1 and 2h-2 structuring the chopper 13 are located at the both ends. In other aspects, the uninterruptible power-supply system 1A is structured similarly to the uninterruptible power-supply system 1.

In other words, in the uninterruptible power-supply system 1A, which is a power conversion device, power conversion units 2u, 2v, 2w forming an inverter 12 and power conversion units 2r, 2s, 2t forming a converter 11 are disposed such that corresponding phases are in parallel and adjacent to each other. For example, the U-phase power conversion unit 2u of the inverter 12 and the R-phase power conversion unit 2r of the converter 11 are disposed in parallel and adjacent to each other.

Further, at the end portions of the uninterruptible power-supply system 1A, the power conversion unit 2h-1 and 2h-2 forming the chopper 13 are disposed.

Figure 18:
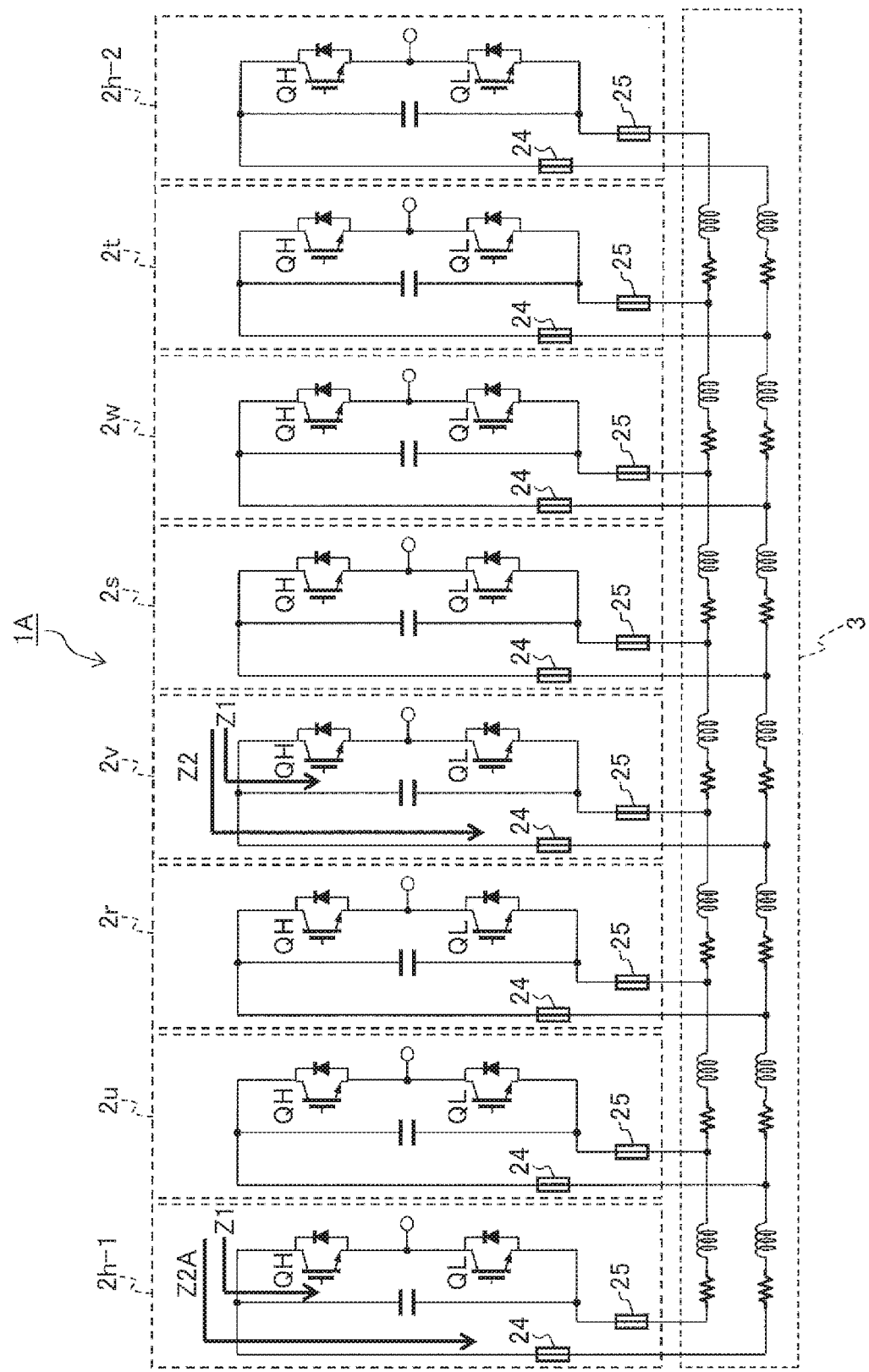
FIG. 18 is a circuit diagram showing the structure of the uninterruptible power-supply system in the second embodiment.

FIG. 18 is an equivalent circuit diagram showing the structure of the uninterruptible power-supply system 1A in the second embodiment.

The ripple current Irip flowing to the capacitors C1, C2 fitted to the each individual power conversion unit 2 is the difference between the current Ipm drawn by the power semiconductor module 21 of the own phase and the sneak current Iac sneaking from the power semiconductor module 21 of the other phases.

Herein, by electrically connecting the P-terminals and the N-terminals of the respective power conversion units 2 by the PN laminated busbar 3 and reducing the impedances between the capacitors C1, C2 of the respective phases, currents flow into the power semiconductor modules 21 from the capacitors C1, C2 of the other phase in addition to the capacitors C1, C2 of the own phase.

That is, the ripple current Irip flowing into the capacitors C1, C2 of the own phase becomes a current that is formed by the difference between the current Ipm drawn by the power semiconductor module 21 of the own phase, and the sneak current Iac from the power semiconductor modules 21 of the other phases and sneak current Icap from the capacitors C1, C2 of the other phases. Accordingly by increasing the sneak current Icap from the capacitors C1, C2 of the other phases, the ripple current Irip charged to the capacitors C1, C2 of the own phase can be reduced.

Figure 19:
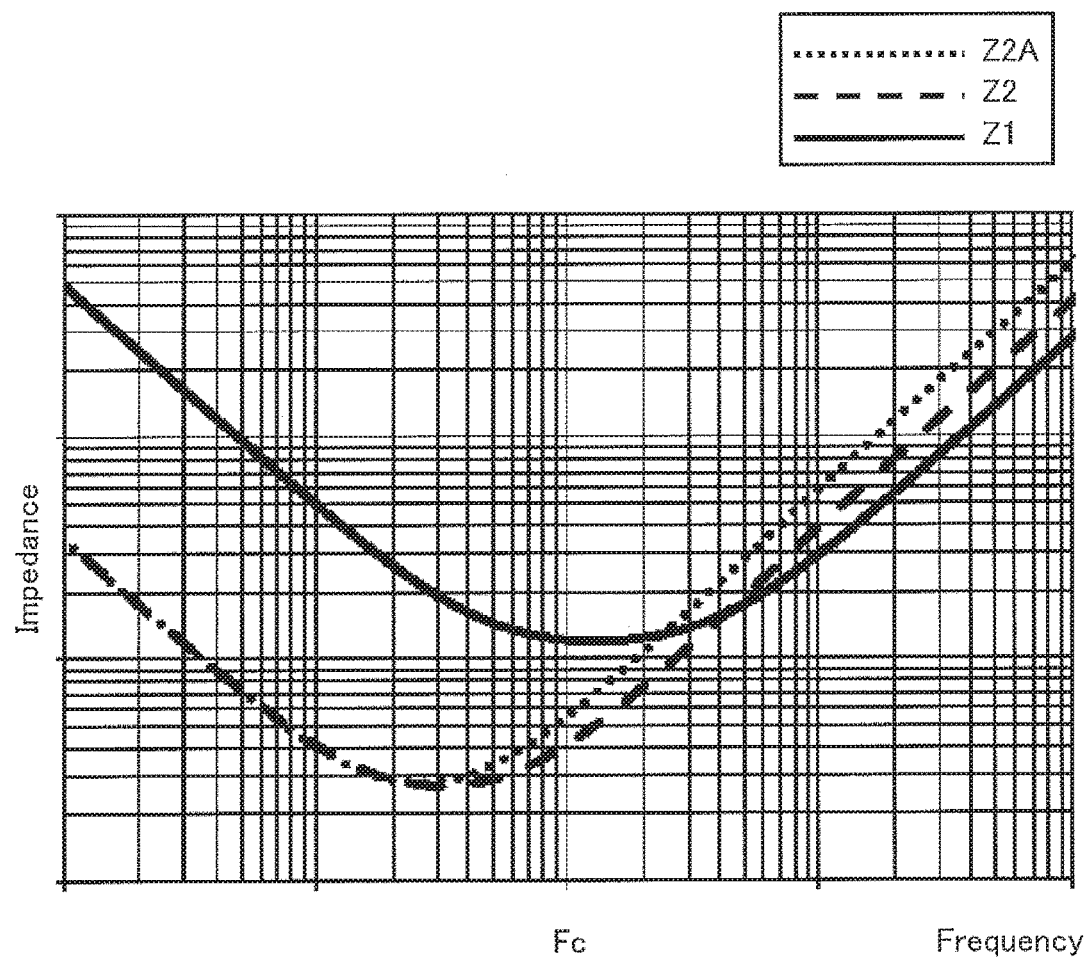
FIG. 19 is an interphase impedance characteristic diagram of the uninterruptible power-supply system in the second embodiment.

FIG. 19 is an interphase impedance characteristic diagram of the uninterruptible power-supply system 1A in the second embodiment. The vertical axis in the diagram represents interphase impedance. The horizontal axis in the diagram represents frequency.

In the power conversion unit 2h-1 and the power conversion unit 2v, the solid curve represents the impedance Z1 between the capacitors C1, C2 of the own phase of a power semiconductor module 21.

The coarse dashed curve represents the impedance Z2 between the capacitors C1, C2 of the other phases than the phase of the power semiconductor module 21 of the power conversion unit 2v at the central portion. The fine dashed curve represents the impedance Z2A between the capacitors C1, C2 of the other phases than the phase of the power semiconductor module 21 of the power conversion unit 2h-1 at the end portion.

In order to increase the sneak current Icap by reducing the impedance between the capacitors C1, C2 of the other phases, it is desired, as shown in FIG. 19, to design such that the impedances Z2, Z2A are lower than the impedance Z1 in carrier signal frequency bands Fc and 2×Fc where ripple current components concentrate.

At the carrier signal frequency Fc, the lower the impedances Z2, Z2A is than the impedance Z1, the more the sneak current Icap from the capacitors C1, C2 of the other phases increases, and the ripple current Irip can be thereby reduced.

In FIG. 19, the impedance Z2 has a lower value than the impedance Z2A at the carrier signal frequency Fc. Accordingly, at the power conversion unit 2v, the sneak current Icap from other phases is higher than at the power conversion unit 2h-1, and it is possible to reduce the ripple current of the capacitors C1, C2 of the own phase.

On the other hand, the power conversion units 2h-1, 2h-2 of the chopper 13 are disposed at the end portions of the uninterruptible power-supply system 1A. Consequently in comparison with the power conversion units 2 of the other phases, the impedance Z2A between the capacitors C1, C2 of the other phased than the phase of the power semiconductor module 21 is higher so that the sneak current Icap from the capacitors C1, C2 of the other phases becomes low and the ripple current of the capacitors C1, C2 of the own phase becomes high.

In the uninterruptible power-supply system 1A in the second embodiment, in order to reduce the ripple currents of the Capacitors C1, C2 of the power conversion units 2 of the inverter 12 and the converter 11 with high driving rate and ensure long-term reliability these power conversion units 2u, 2v, 2w and the power conversion units 2r, 2s, 2t are disposed at the central portion. Further, the power conversion units 2h-1, 2h-2 of the chopper 13 with low driving rate are disposed at the end portions of the uninterruptible power-supply system 1A.

Third Embodiment

Figure 20:
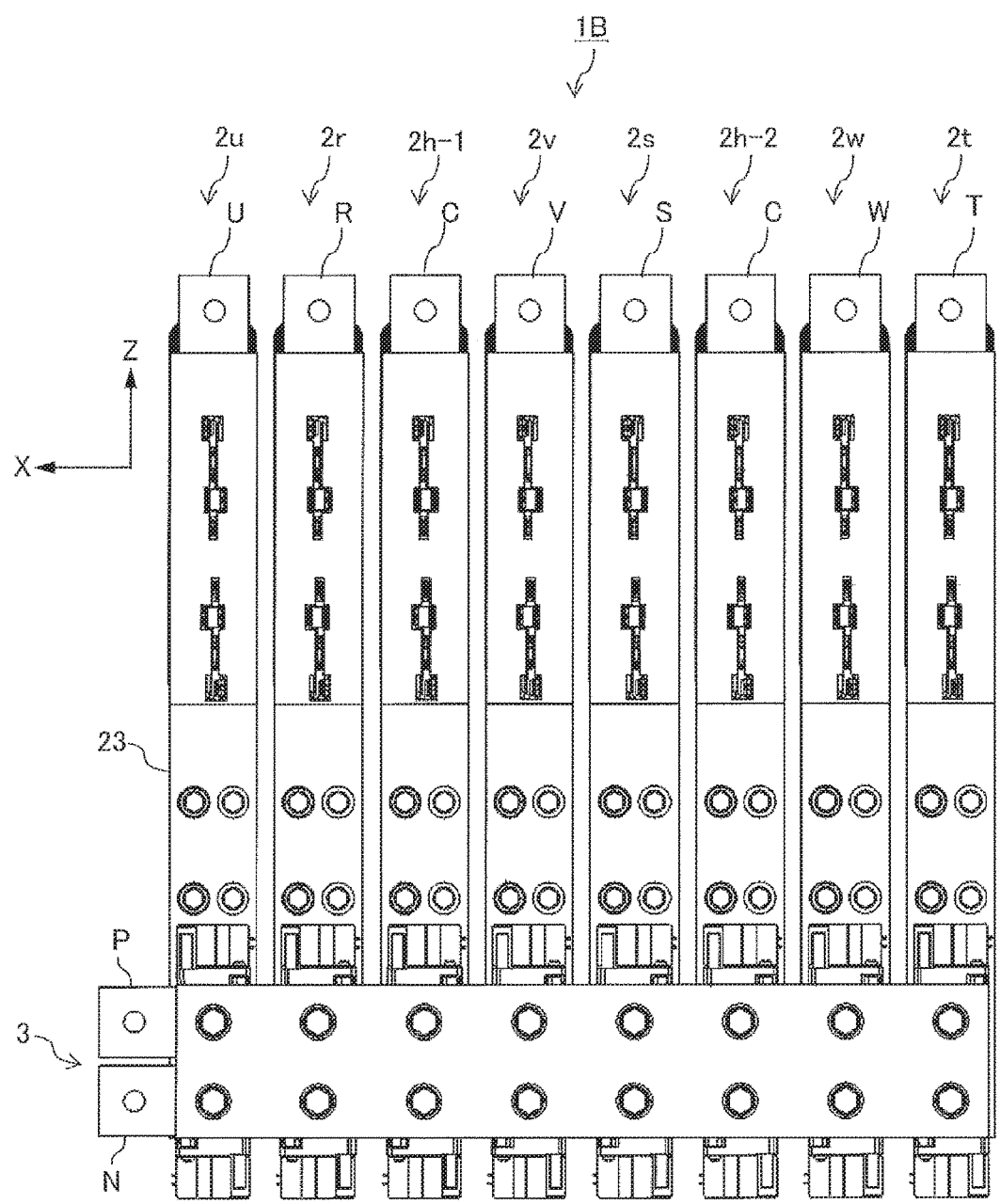
FIG. 20 is a top view showing the structure of an uninterruptible power-supply system in a third embodiment.

FIG. 20 is a top view showing the structure of an uninterruptible power-supply system 1B in a third embodiment. The same symbol is given to an element that is the same as an element of the uninterruptible power-supply system 1 in the first embodiment shown in FIG. 2.

In the uninterruptible power-supply system 1B shown in FIG. 20, similarly to the first embodiment, power conversion units 2u, 2v, 2w structuring an inverter 12 and power conversion units 2r, 2s, 2t structuring a converter 11 are disposed such that corresponding ones are in parallel and adjacent to each other.

Differently from the uninterruptible power-supply system 1 in the first embodiment, in the uninterruptible power-supply system 1B in the third embodiment, a power conversion unit 2h-1 structuring a chopper 13 is disposed between the power conversion unit 2r of R-phase of the converter 11 and the power conversion unit 2v of the V-phase of the inverter 12. Further, a power conversion unit 2h-2 forming the chopper 13 is disposed between the power conversion unit 2s of S-phase of the converter 11 and the power conversion unit 2w of W-phase of the inverter 12.

Differently from the uninterruptible power-supply system 1 (see FIG. 2) in the first embodiment, the uninterruptible power-supply system 1B in the third embodiment, the power conversion units 2h-1, 2h-2 structuring the chopper 13 are disposed at the middle portion. The impedance between the capacitors C1, C2 of the other phases than the phases of the power semiconductor modules 21 of the power conversion units 2 disposed at the middle portion can be reduced in comparison with a case in which the power conversion units 2h-1, 2h-1 were disposed at the end portions. Thus, the sneak current Icap from the capacitors C1, C2 of the other phases increases so that the ripple current of the capacitors C1, C2 of the own phase can be reduced.

Accordingly, the uninterruptible power-supply system 1B in the third embodiment is effective in a case where specification of ripple current required to the power conversion units 2 forming the chopper 13 is more stringent, in comparison with the specification of ripple current of the power conversion units 2 of the inverter 12 and the converter 11.

Fourth Embodiment

Figure 21:
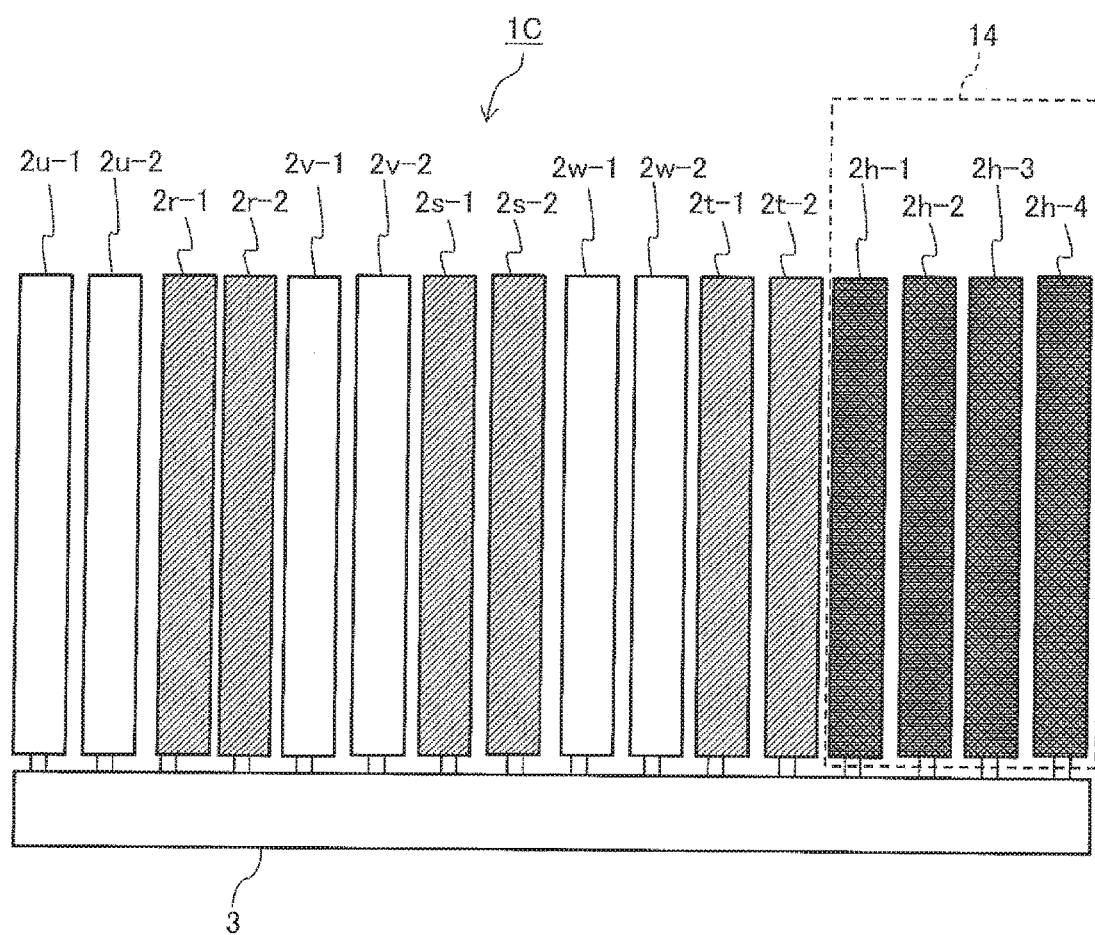
FIG. 21 is a diagram showing schematic structure of an uninterruptible power-supply system in a fourth embodiment.

FIG. 21 is a diagram showing the schematic structure of an uninterruptible power-supply system 1C in a fourth embodiment.

For the uninterruptible power-supply system 1C in the fourth embodiment, assumption is made such that in specification, the capacity of output power is doubled in comparison with the uninterruptible power-supply system 1 (see FIG. 2) in the first embodiment, and the number of the respective power conversion units 2, which are disposed in parallel, structuring the inverter 12, the converter 11, and the chopper 13 is doubled.

The inverter 12 is structured by power conversion units 2u-1, 2u-2 forming U-phase, power conversion units 2v-1, 2v-2 forming V-phase, and power conversion units 2w-1, 2w-2 forming W-phase.

The converter 11 is structured by power conversion units 2r-1, 2r-2 forming R-phase, power conversion units 2s-1, 2s-2 forming S-phase, and power conversion units 2t-1, 2t-2 forming T-phase.

The chopper 13 is structured by power conversion units 2h-1, 2h-2, 2h-3, 2h-4.

The respective power conversion units 2 are the same as the power conversion units 2 shown in FIG. 4 and FIG. 5, wherein the P-terminals and the N-terminals of the respective uninterruptible power-supply systems 1 are respectively electrically connected by a PN laminated busbar 3.

As shown in FIG. 21, the power conversion units 2u-1, 2u-2, 2v-1, 2v-2, 2w-1, 2w-2 structuring the inverter 12 and the power conversion units 2r-1, 2r-2, 2s-1, 2s-2, 2t-1, 2t-2 forming the converter 11 are disposed such that the power conversion units 2 of corresponding phase are adjacent to and in parallel to each other.

For example, by this structure, the U-phase power conversion units 2u-1, 2u-2 of the inverter 12 and the R-phase power conversion units 2r-1, 2r-2 of the converter 11 can reduce the impedances between corresponding phases, and reduce ripple currents flowing in the capacitors C1, C2 of the respective power conversion units 2.

Fifth Embodiment

Figure 22:
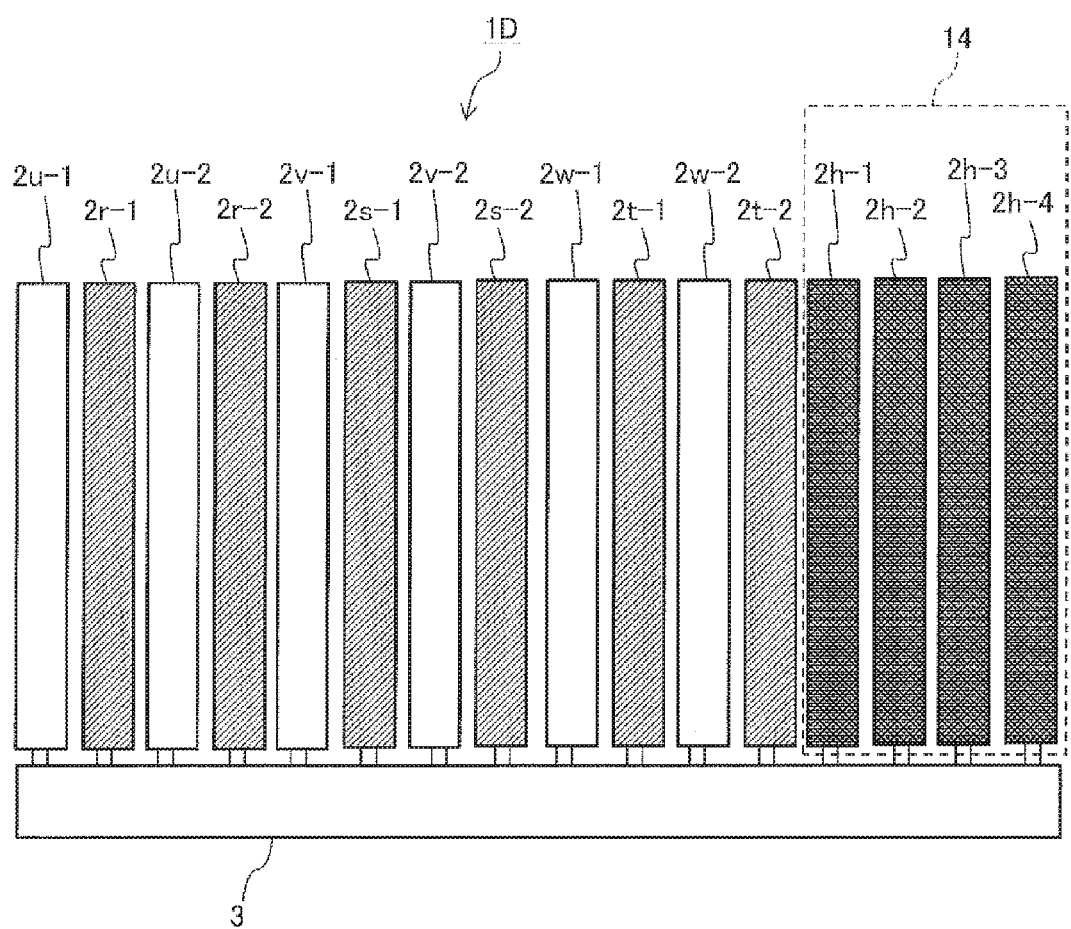
FIG. 22 is a diagram showing schematic structure of an uninterruptible power-supply system in a fifth embodiment.

FIG. 22 is a diagram showing a general structure of an uninterruptible power-supply system 1D in a fifth embodiment.

Similarly to the uninterruptible power-supply system 1C (see FIG. 21) in the fourth embodiment, also for the uninterruptible power-supply system 1D in the fifth embodiment, assumption is made such that, in specification, the capacity of output power is doubled, and the number of the respective power conversion units 2, which are disposed in parallel, structuring the inverter 12, the converter 11, and the chopper 13, is doubled.

As shown in FIG. 22, the power conversion units 2 structuring the inverter 12 and the power conversion units 2 forming the converter 11 are disposed such that the power conversion units 2 of corresponding phase are adjacent to and in parallel to each other.

The U-phase power conversion unit 2u-1 of the inverter 12, the R-phase power conversion unit 2r-1 of the converter 11, the U-phase power conversion unit 2u-2 of the inverter 12, and the R-phase power conversion unit 2r-2 of the converter 11 are disposed in this order, and adjacent to and parallel to each other.

The V-phase power conversion unit 2v-1 of the inverter 12, the S-phase power conversion unit 2s-1 of the converter 11, the V-phase power conversion unit 2v-2 of the inverter 12, and the S-phase power conversion unit 2s-2 of the converter 11 are disposed in this order, and adjacent to and parallel to each other.

The W-phase power conversion unit 2w-1 of the inverter 12, the T-phase power conversion unit 2t-1 of the converter 11, the W-phase power conversion unit 2w-2 of the inverter 12, and the T-phase power conversion unit 2t-2 of the converter 11 are disposed in this order, and adjacent to and parallel to each other.

By this structure, the uninterruptible power-supply system 1D in the fifth embodiment, impedances between corresponding phases can be minimized, and ripple currents flowing to the capacitors C1 and C2 of the respective power conversion units 2 can be reduced.

Modified Example

The present invention is not limited to the above-described embodiments, and covers various modified examples. For example, the above-described embodiments have been described in detail to describe the present invention in a comprehensible way and is not necessarily limited to one that includes all the described structures or elements. A part of structures in a certain embodiment can be replaced by structures of another embodiment, and it is also possible to add structures of another embodiment to the structures of a certain embodiment. Still further, a part of the structures of the each embodiment can be subjected to addition, deletion, or replacement by other structures.

The above-described respective structures, functions, processing sections, processing procedures, and the like may be partially or totally realized by hardware, for example, an integrated circuit. The above-described respective structures, functions, and the like may be realized by software by interpreting and executing a program in which processors realize respective functions.

In the respective embodiments, control lines and information lines that are considered to be necessary for description of the embodiments are shown, and all control lines and information lines for a product are not always or necessarily shown. Actually, it may be considered that almost all the structures are connected with each other.

Modified examples of the present invention, for example, include the following (a) and (b).
(a) In the above-described embodiments, uninterruptible power-supply systems are referred to, however, application to different kinds of power converters are also possible, without being limited to the structures of the above-described embodiments.
(b) In the above-described embodiments, IGBTs are used as the switching elements QH, QL, and diodes are used as the rectifying elements DH, DL. However, without being limited thereto, other kinds of elements can also be applied.

DESCRIPTION OF REFERENCE SYMBOLS 1, 1A-1D: uninterruptible power-supply system (power conversion device)
11: converter
12: inverter
13: chopper
2: power conversion unit
21: power semiconductor module
22: cooling fin
23: main circuit busbar
24, 25: fuse element
26: control signal terminal
27: half bridge circuit
3: PN laminated busbar (laminated conductor)
4: control circuit
41: fundamental-wave signal generation section
42: carrier signal generation section (triangular wave signal generation section)
43: inverter control section (inverter three-phase PWM signal generation section)
44: converter control section (converter three-phase PWM signal generation section)
45: chopper control section
5: commercial power source
6: storage battery
7: load
C1, C2: capacitor
DH, DL: rectifying element
QH, QL: switching element

The invention claimed is:

1. A power converter that includes a laminated conductor, conductors being laminated for the laminated conductor, and plural power conversion units and supplies power from a commercial power source through a converter and an inverter to a load,
wherein the power conversion units include respective power semiconductor modules, capacitors, and main circuit busbars, and are provided with respective positive terminals, negative terminals, and AC•DC terminals, the positive terminals being connected with each other and the negative terminals being connected with each other through the laminated conductor,
wherein at least one of the power conversion units forms a phase of a converter that converts alternating current input to the AC•DC terminal and supplies the converted current, as direct current, between the positive terminal and the negative terminal thereof,
wherein at least another one of the power conversion units forms a phase of the inverter that converts direct current supplied through the positive terminal and the negative terminal thereof and supplies alternating current to the AC•DC terminal,
wherein the power conversion unit forming a certain phase of the inverter is arranged such that the positive terminal thereof is connected through the laminated conductor adjacently to the positive terminal of the power conversion unit that forms the corresponding phase of the converter, and the negative terminal thereof is connected through the laminated conductor adjacently to the negative terminal of the power conversion unit that forms the corresponding phase of the converter,
wherein a three-phase inverter and a three-phase converter are structured by the plural power conversion units,
wherein the power conversion units of respective phases of the three-phase converter and the power conversion units of the respective corresponding phases of the three-phase converter are disposed respectively adjacent to each other,
wherein a control circuit that outputs a three-phase PWM control signal is further included, and
wherein the control circuit includes:
a triangular wave signal generation section for generating an inverter triangular wave signal and a converter triangular wave signal that synchronizes with the inverter triangular wave signal at the same frequency and with a certain phase difference;
an inverter three-phase PWM signal generation section supplied with the inverter triangular wave signal; and
a converter three-phase PWM signal generation section supplied with the converter triangular wave signal.

2. The power conversion device according to claim 1, wherein the laminated conductor is disposed on the same side surface plane of the main circuit busbar.

3. The power conversion device according to claim 1, wherein the control circuit is structured, including a fundamental-wave signal generation section that generates an inverter three-phase fundamental-wave signal and a converter three-phase fundamental-wave signal that synchronizes with the inverter three-phase fundamental-wave signal at the same frequency and with a certain phase difference,
wherein the inverter three-phase PWM signal generation section is supplied with the inverter three-phase fundamental-wave signal,
and wherein the converter three-phase PWM signal generation section is supplied with the converter three-phase fundamental-wave signal.

4. The power conversion device according to claim 3, wherein phase difference between the inverter triangular wave signal and the converter triangular wave signal is in a range from −20 degrees to +20 degrees,
and wherein the phase differences between the inverter three-phase fundamental-wave signals of certain phases and the converter three-phase fundamental-wave signals of the corresponding phases are in a range from −45 degrees to +45 degrees.

5. The power conversion device according to claim 3, wherein the phase difference between the inverter triangular wave signal and the converter triangular wave signal is in a range from 160 degrees to 200 degrees,
and wherein the phase differences between the inverter three-phase fundamental-wave signals of certain phases and the converter three-phase fundamental-wave signals of the corresponding phases are in a range from 135 degrees to 225 degrees.

6. The power conversion device according to claim 1, wherein at least one of the other power conversion units structures a direct current conversion section that performs voltage conversion of a direct current signal having been input to the AC•DC terminal and supplies, between the positive terminal and the negative terminal, a converted direct current.

7. The power conversion device according to claim 6, wherein the plural power conversion units are disposed in parallel on a line on the same plane,
and wherein the two units at both ends structure a direct current conversion section.

8. The power conversion device according to claim 6, wherein the plural power conversion units are disposed in parallel on a line on the same plane,
and the two units at both ends form a phase of the inverter or a phase of the converter.

9. The power conversion device according to claim 1, wherein the plural power conversion units structure an three-phase inverter and a three-phase converter,
and wherein respective phases of the three-phase inverter and respective phases of the three-phase converter are formed with connection of respective plural power conversion units in parallel.

10. The power conversion device according to claim 9, wherein plural power conversion units forming certain phases of the three-phase inverter and plural power conversion units forming the corresponding phases of the three-phase converter are alternately disposed adjacent to each other.

11. The power conversion device according to claim 9, wherein the respective phases of the three-phase inverter and the respective corresponding phases of the three-phase converter are disposed adjacent to each other.

12. A power conversion method for a power converter that includes a laminated conductor, conductors being laminated for the laminated conductor, plural power conversion units, a control circuit that outputs a three-phase PWM control signal, and supplies power from a commercial power source through a converter and an inverter to a load,
wherein the power conversion units include respective power semiconductor modules, capacitors, and main circuit busbars, and are provided with respective positive terminals, negative terminals, and AC•DC terminals, the positive terminals being connected with each other and the negative terminals being connected with each other through the laminated conductor, wherein at least three of the power conversion units form a three-phase converter that converts alternating current having been input to the AC•DC terminal and supplies the converted current, as direct current, between the positive terminal and the negative terminal thereof, wherein at least other three of the power conversion units structure a three-phase inverter that converts direct current supplied through the positive terminal and the negative terminal thereof and supplies alternating current to the AC•DC terminal, wherein the respective phases of the three-phase inverter and the respective corresponding phases of the three-phase converter are disposed respectively adjacent to each other, wherein the control circuit:

generates an inverter triangular wave signal and supplies the inverter triangular wave signal to an inverter three-phase PWM signal generation section; and generates a converter triangular wave signal that synchronizes with the inverter triangular wave signal at the same frequency and with a certain phase difference, and supplies the converter triangular wave signal to a converter three-phase PWM signal generation section.

13. The power conversion method for a power conversion device according to claim 12, wherein the control circuit:

generates an inverter three-phase fundamental-wave signal and supplies the inverter three-phase fundamental-wave signal to the inverter three-phase PWM signal generation section: and generates a converter three-phase fundamental-wave signal that synchronizes with the inverter three-phase fundamental-wave signal at the same frequency and with a certain phase difference and supplies the converter three-phase fundamental-wave signal to the converter three-phase PWM signal generation section.

* * * * *